United States Patent
Ohashi

Patent Number: 5,617,254
Date of Patent: Apr. 1, 1997

[54] COMPACT ZOOM LENS

[75] Inventor: Kazuyasu Ohashi, Tokyo, Japan

[73] Assignee: Ricoh Company, Ltd., Tokyo, Japan

[21] Appl. No.: 581,994

[22] Filed: Jan. 2, 1996

[30] Foreign Application Priority Data

Mar. 20, 1995 [JP] Japan .................................. 7-061381

[51] Int. Cl.$^6$ .............................. G02B 15/14; G02B 3/02
[52] U.S. Cl. ........................................... 359/692; 359/713
[58] Field of Search ...................................... 359/692, 713

[56] References Cited

U.S. PATENT DOCUMENTS

| | | | |
|---|---|---|---|
| 4,836,660 | 6/1989 | Ito ............................................ | 359/713 |
| 5,398,135 | 3/1995 | Ohashi ...................................... | 359/692 |
| 5,459,616 | 10/1995 | Kawamura et al. ...................... | 359/692 |

FOREIGN PATENT DOCUMENTS

| | | | |
|---|---|---|---|
| 511186 | 1/1993 | Japan . | |
| 5127082 | 5/1993 | Japan . | |
| 40-5-249375 | 9/1993 | Japan ...................................... | 359/692 |

Primary Examiner—Georgia Y. Epps
Assistant Examiner—Evelyn A. Lester
Attorney, Agent, or Firm—Oblon, Spivak, McClelland, Maier & Neustadt, P.C.

[57] ABSTRACT

A compact zoom lens performs a zooming operation by changing a clearance between a first lens group having a positive focal length and a second lens group having a negative focal length. The first lens group is constructed by sequentially arranging first to fourth lenses from an object side. The second lens group is constructed by sequentially arranging fifth and sixth lenses from an object side. An aperture stop is arranged just after the first lens group. The following conditions (1) $0.60 < f_I/f_W < 0.75$, (2) $-1.10 < f_{II}/f_T < -0.90$, (3) $EP/f_W < 0.25$, (4) $AP_W/f_T > -0.16$ are satisfied when $f_W$ is a focal length of an entire lens system at a short focal end; $f_T$ is a focal length of the entire lens system at a long focal end; $f_I$ is a focal length of the first lens group; $f_{II}$ is a focal length of the second lens group; EP is a distance from a lens front end to an entrance pupil; and $AP_W$ is a distance from a lens rear end at the short focal end to an exit pupil.

11 Claims, 18 Drawing Sheets

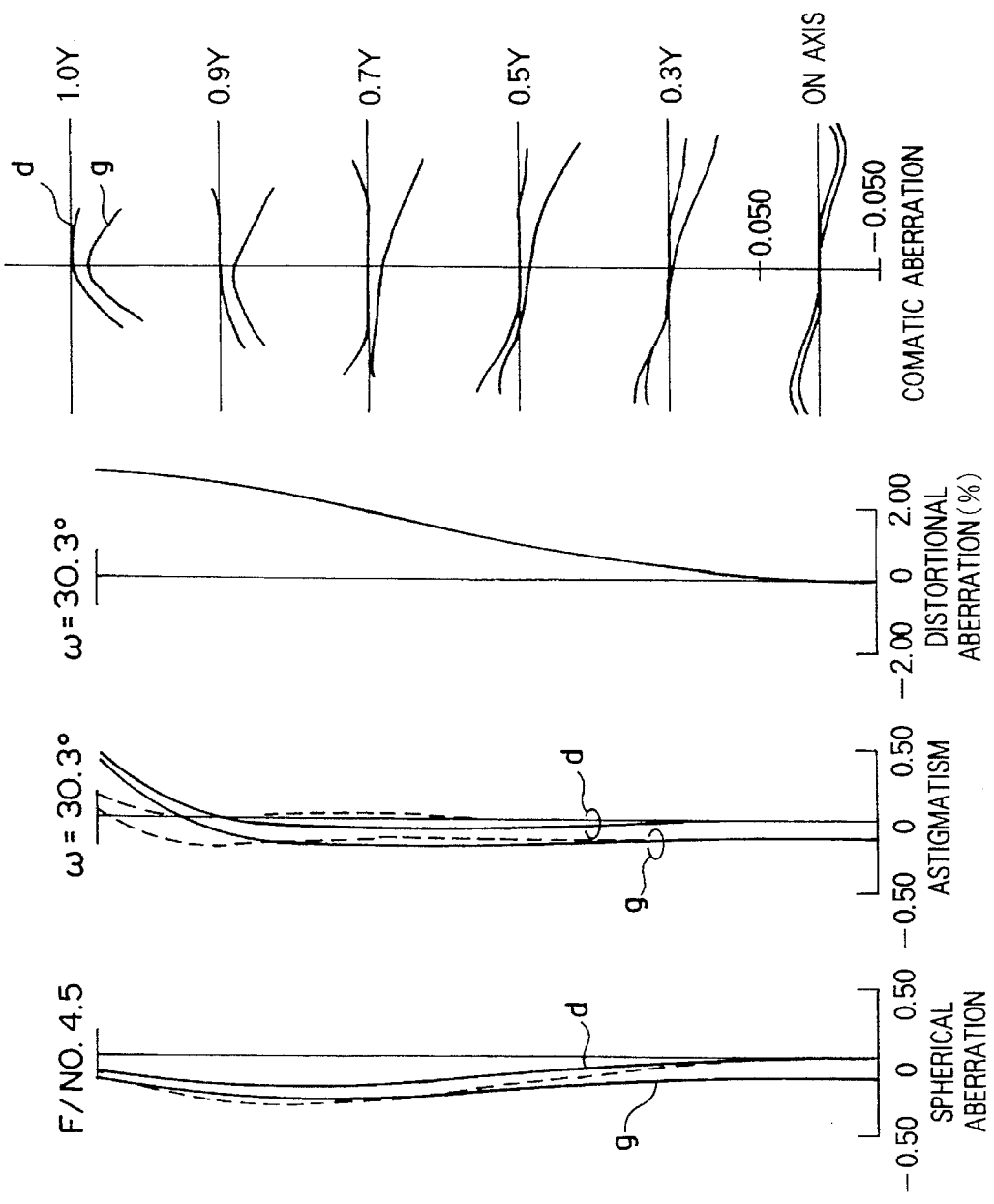

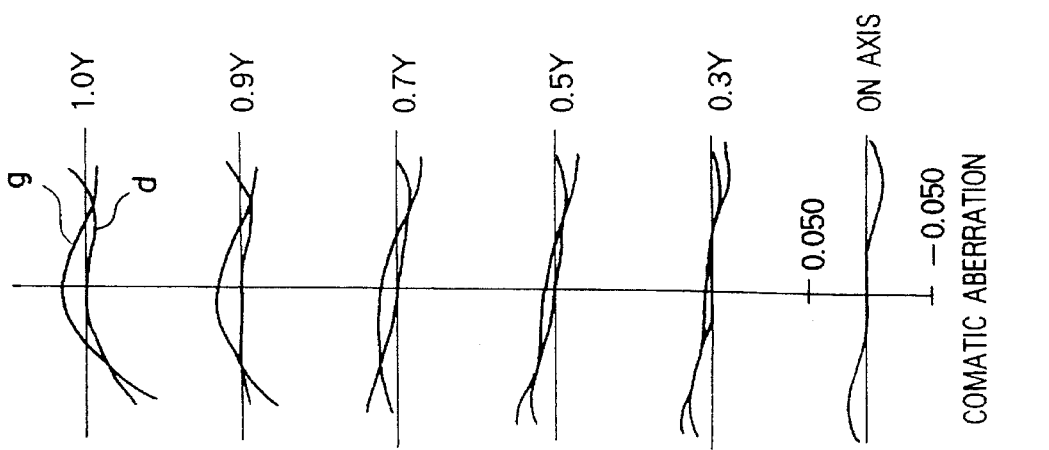
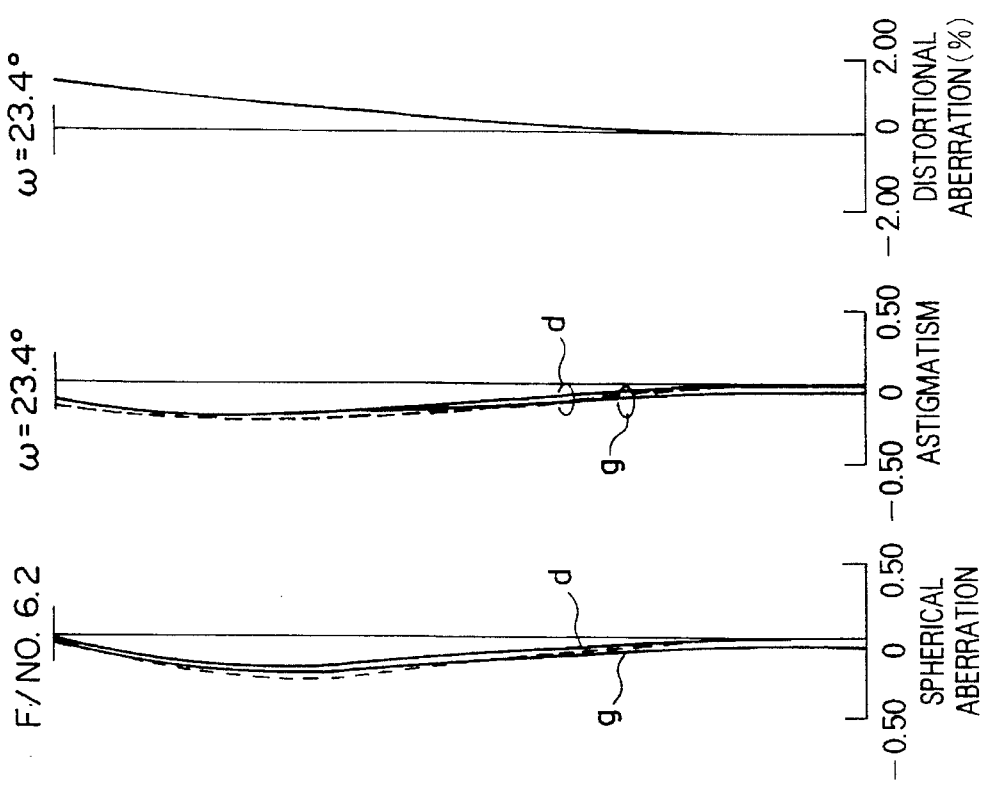

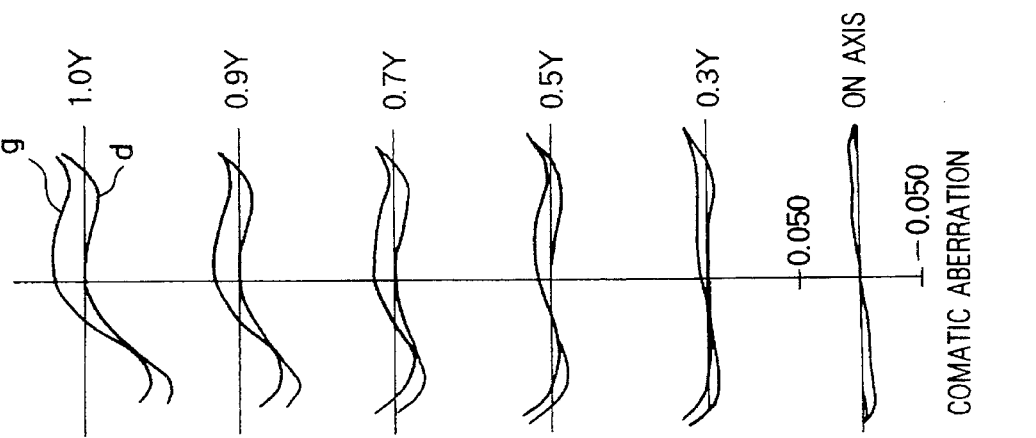
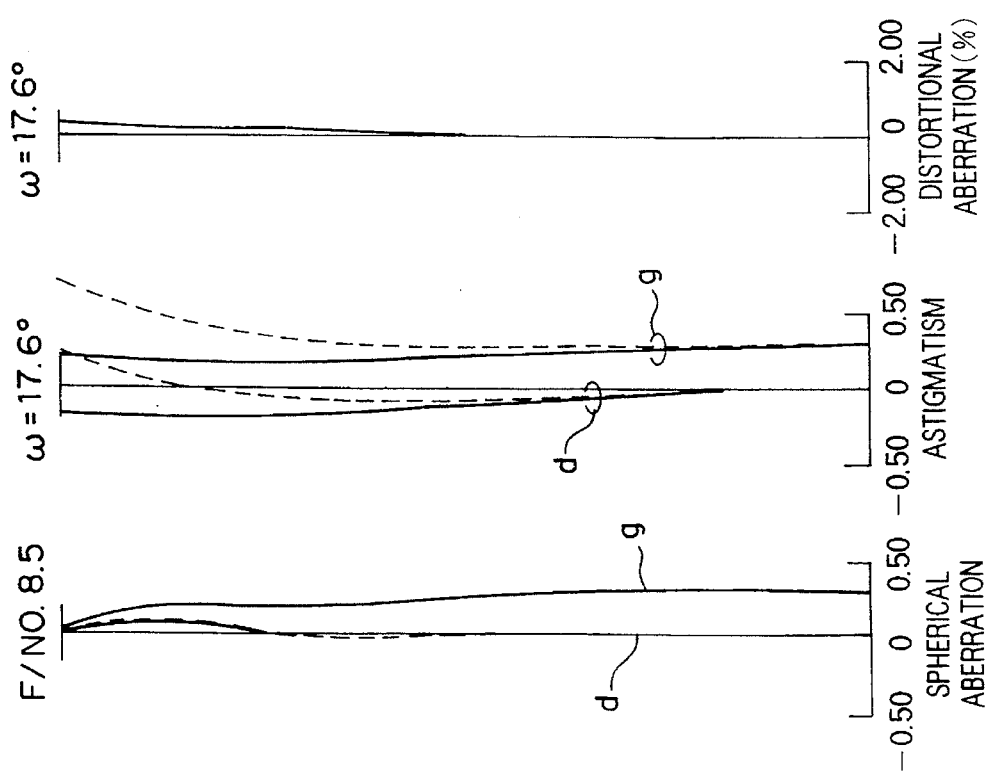

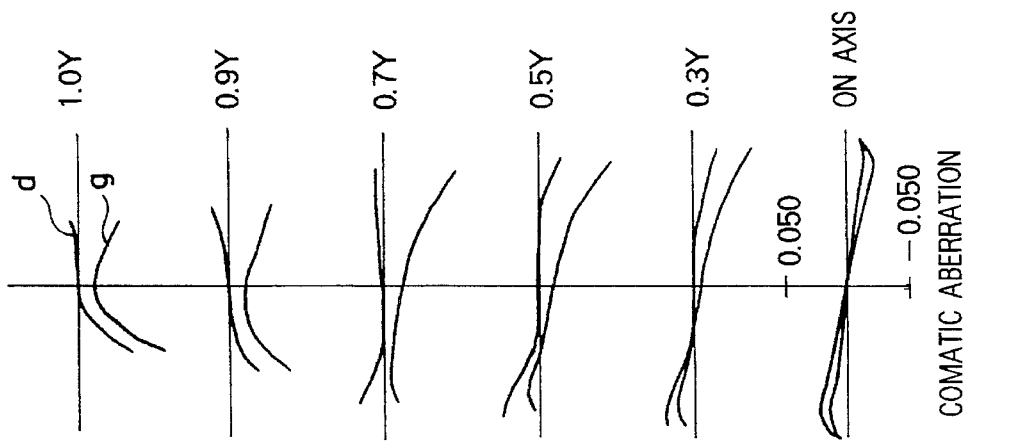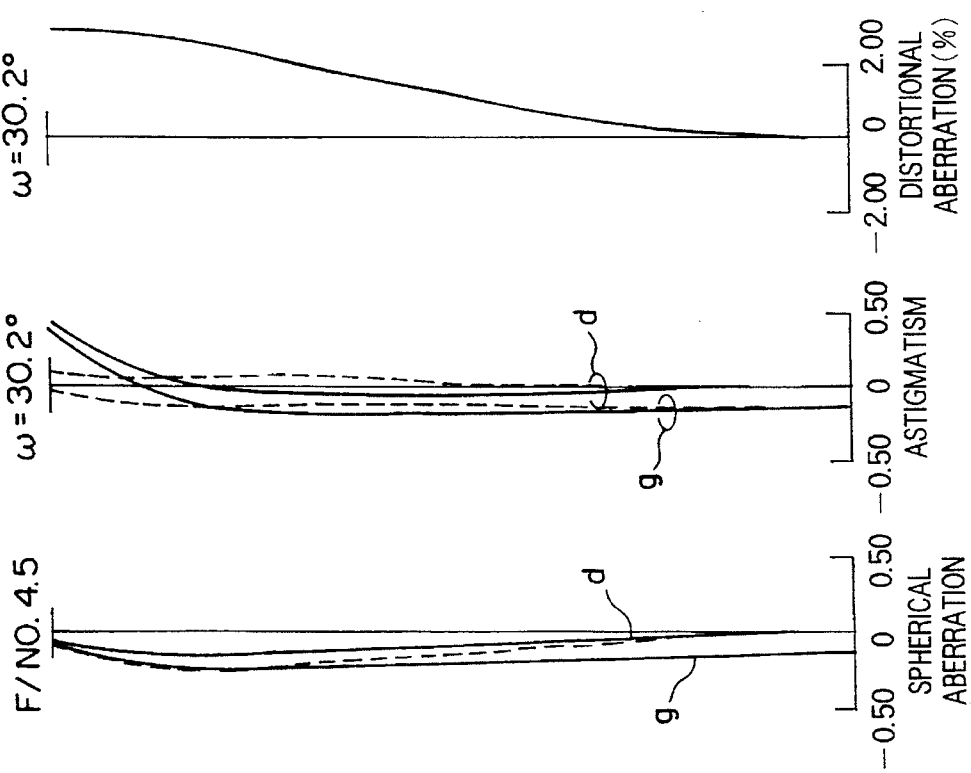

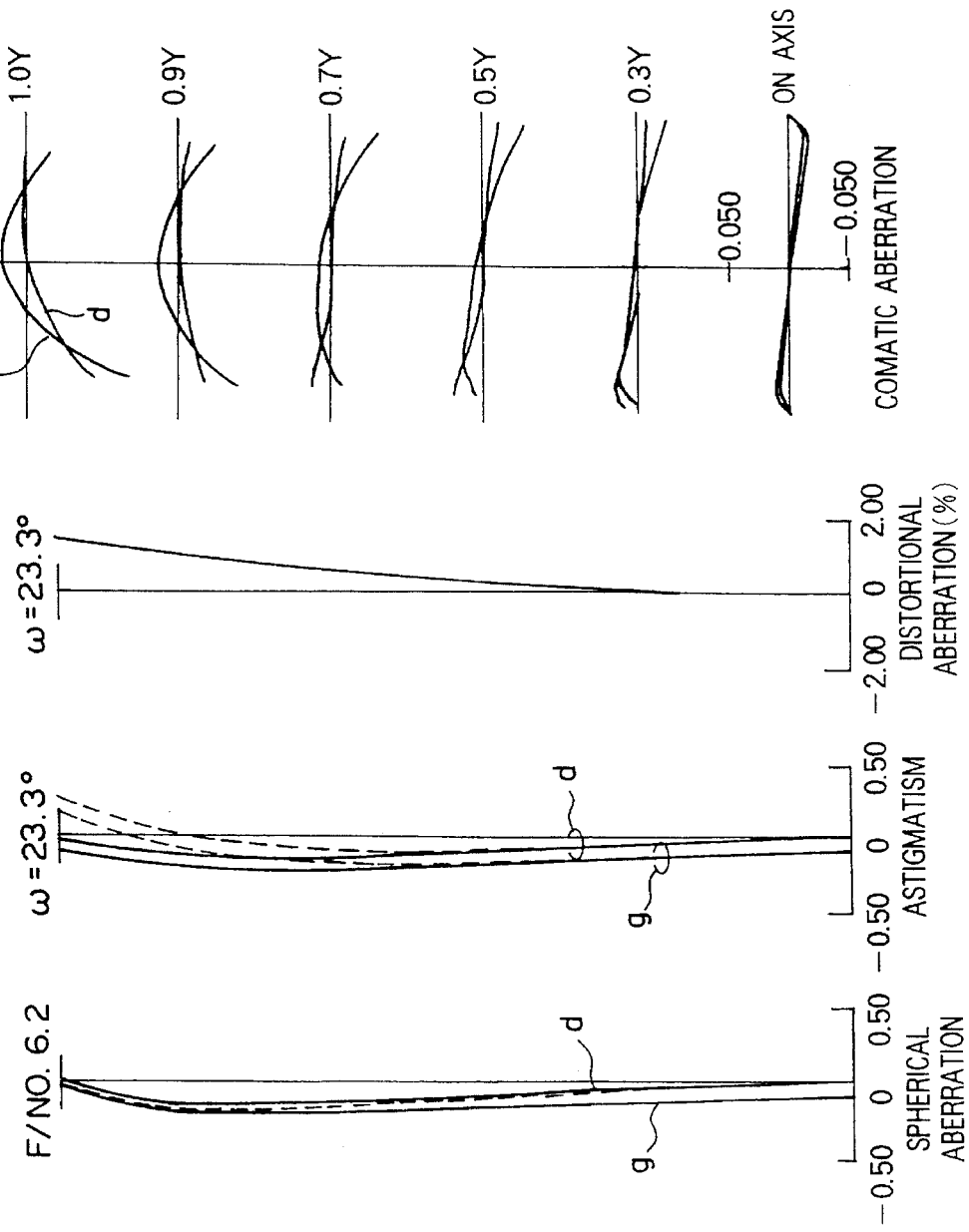

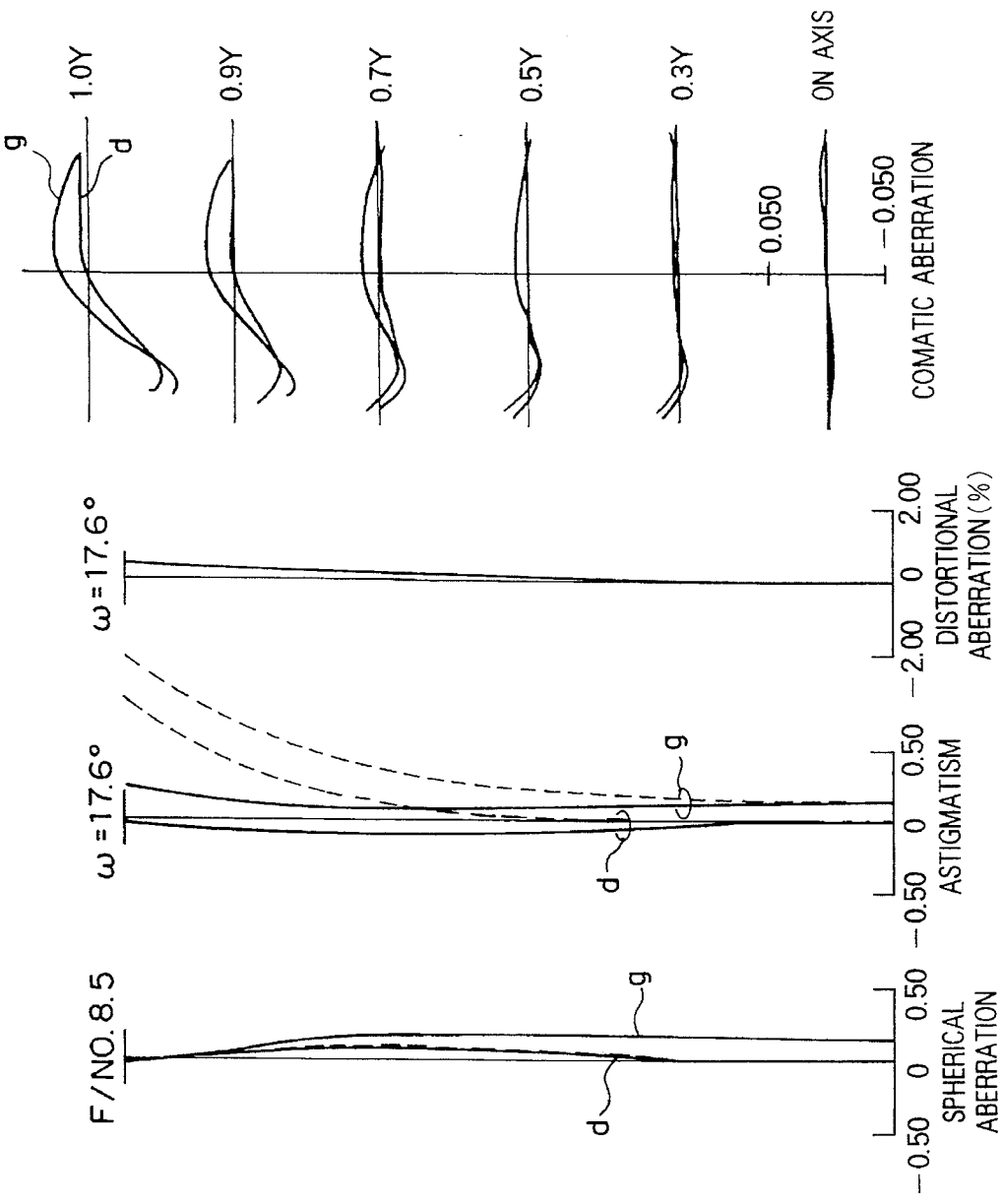

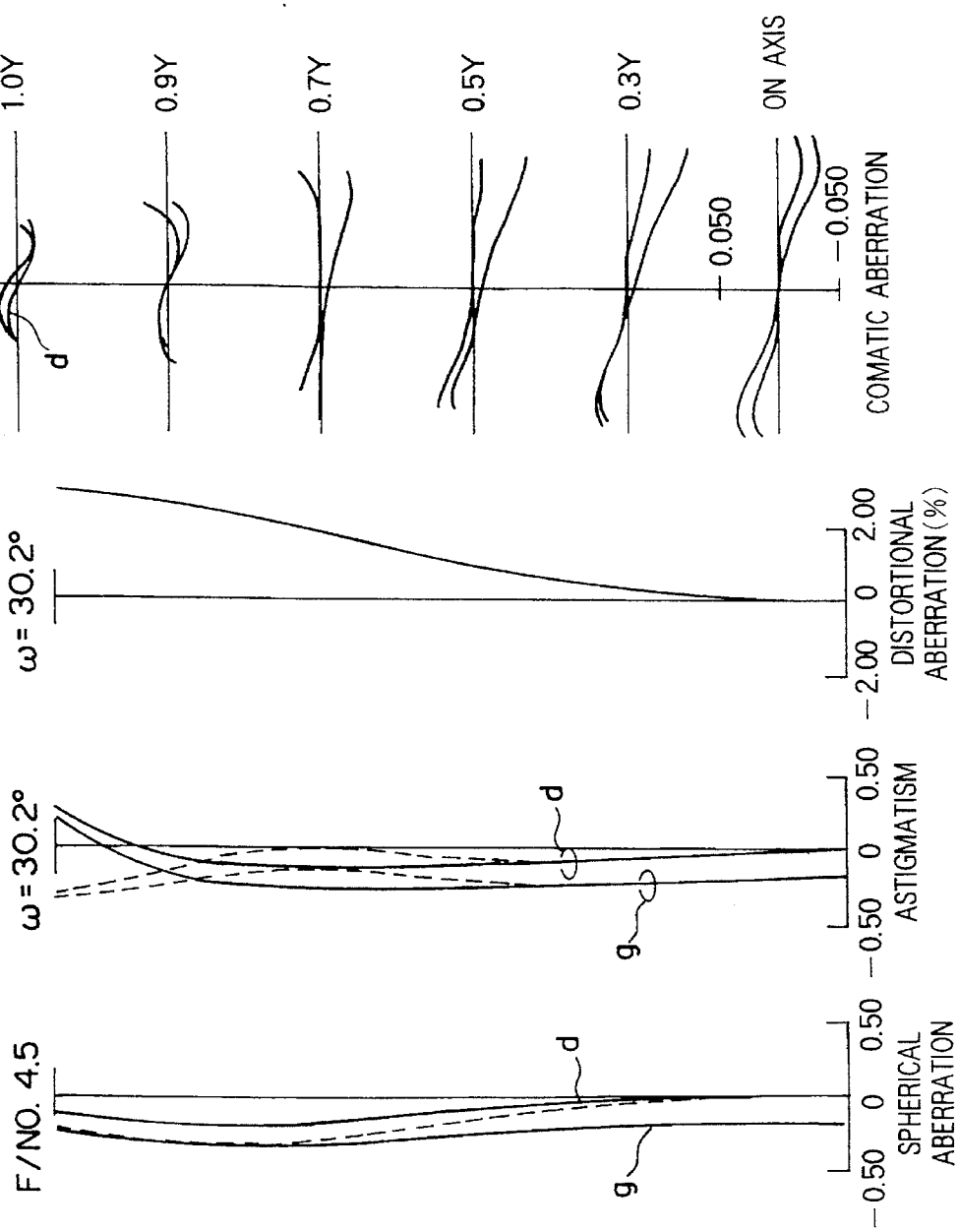

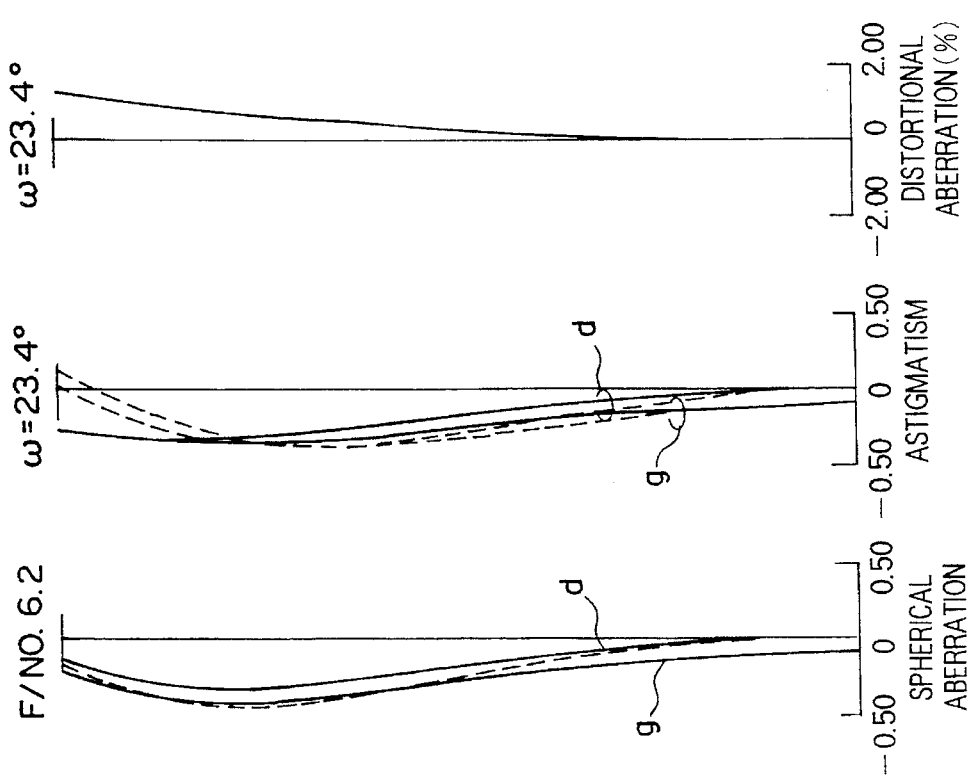

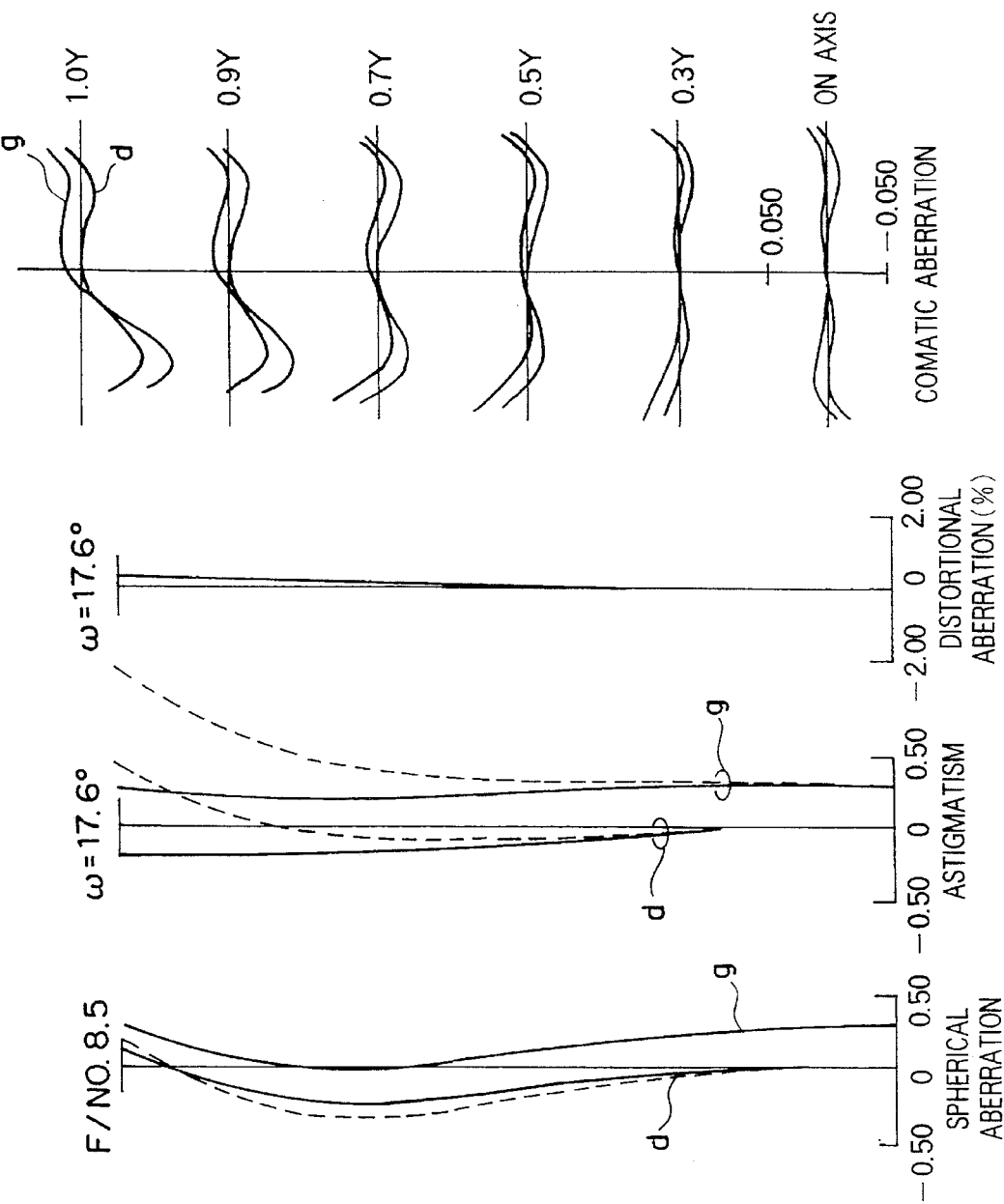

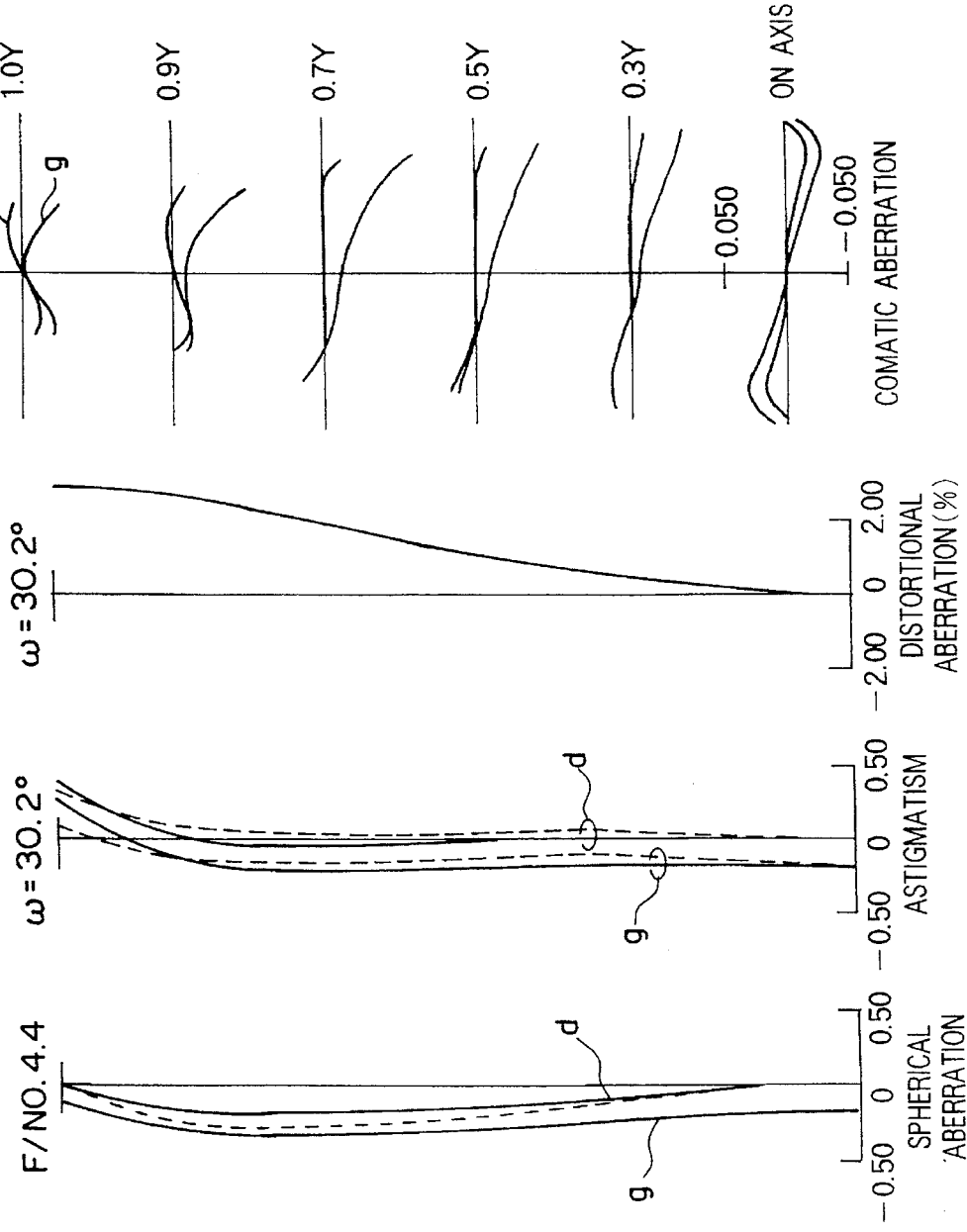

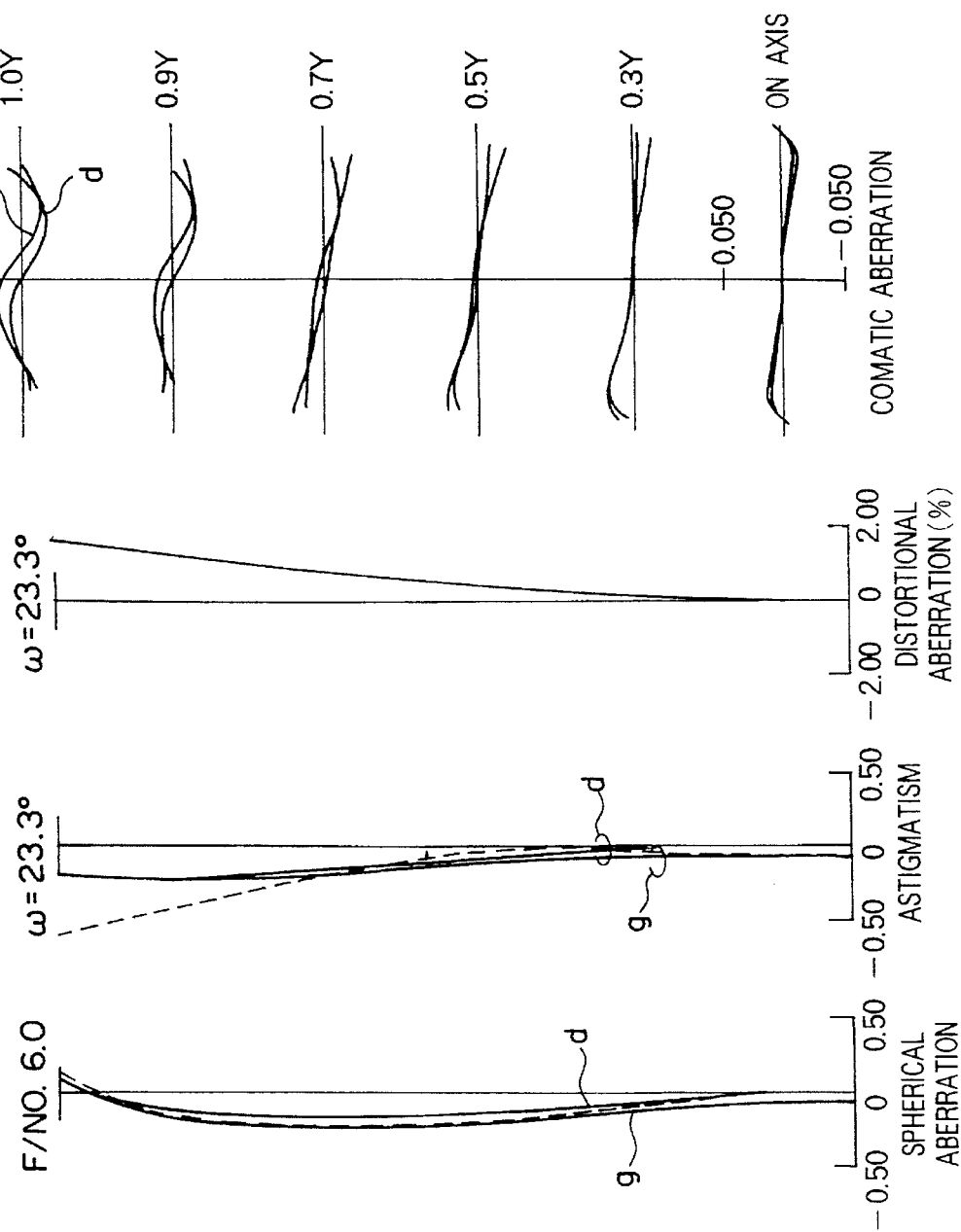

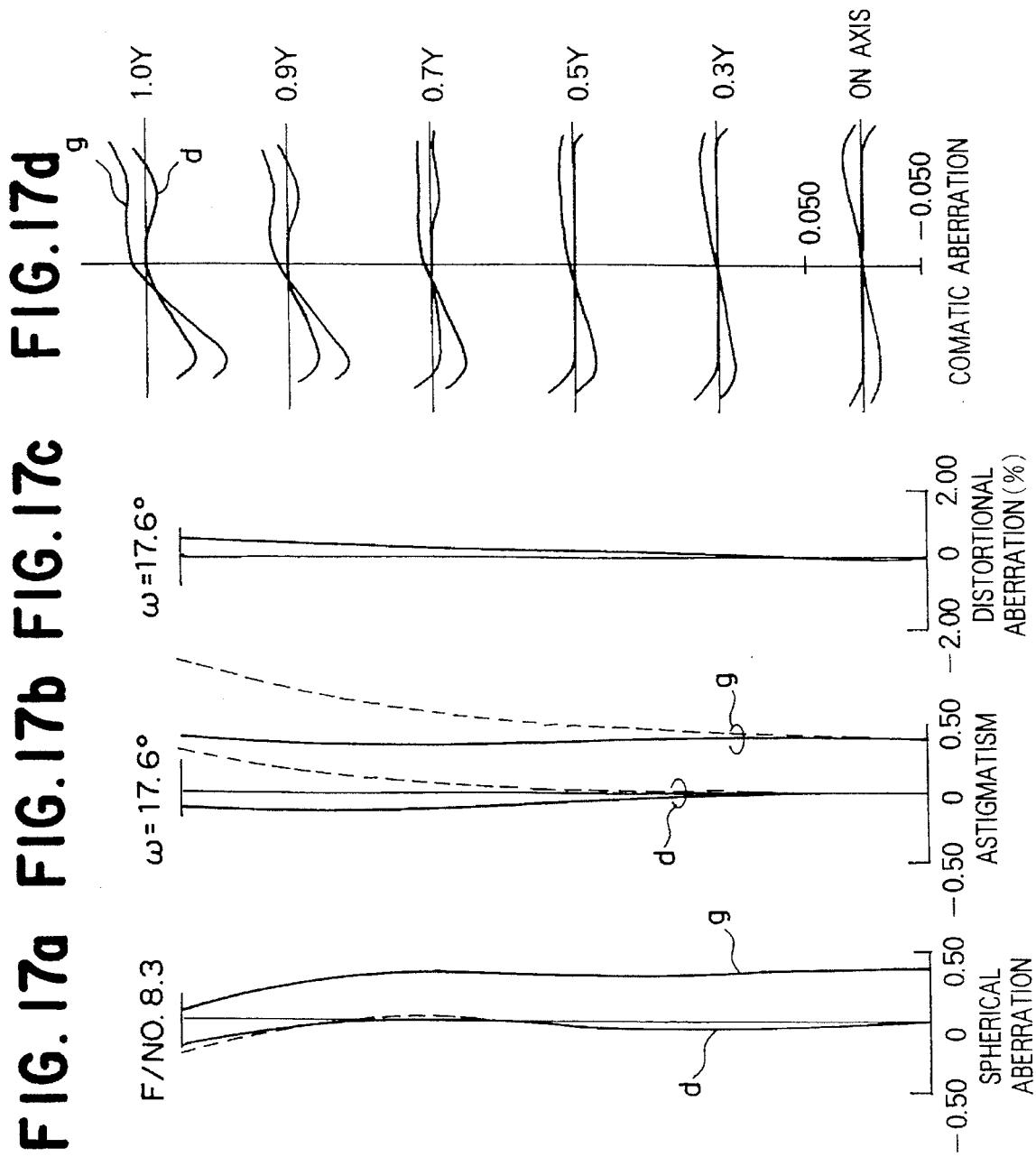

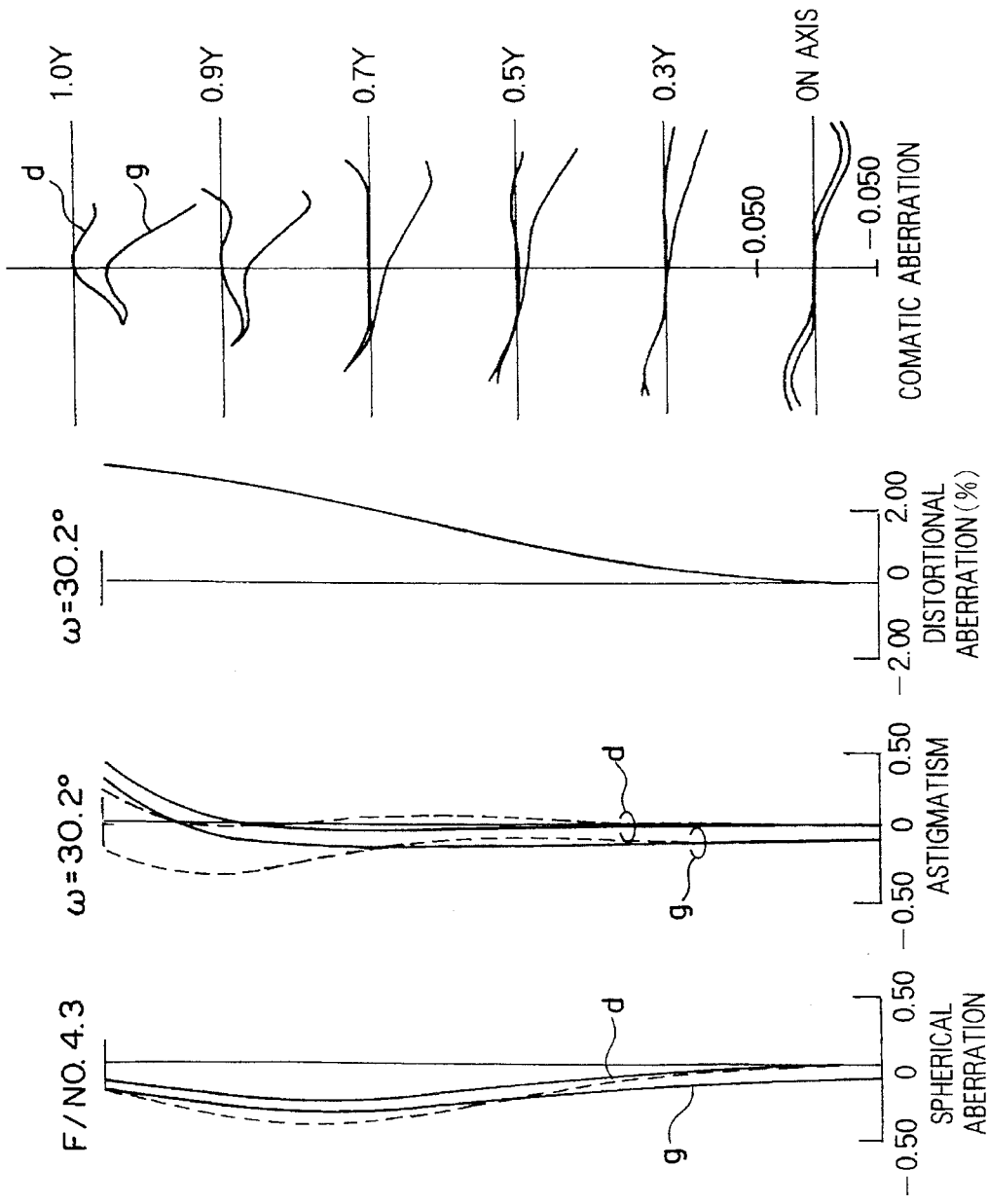

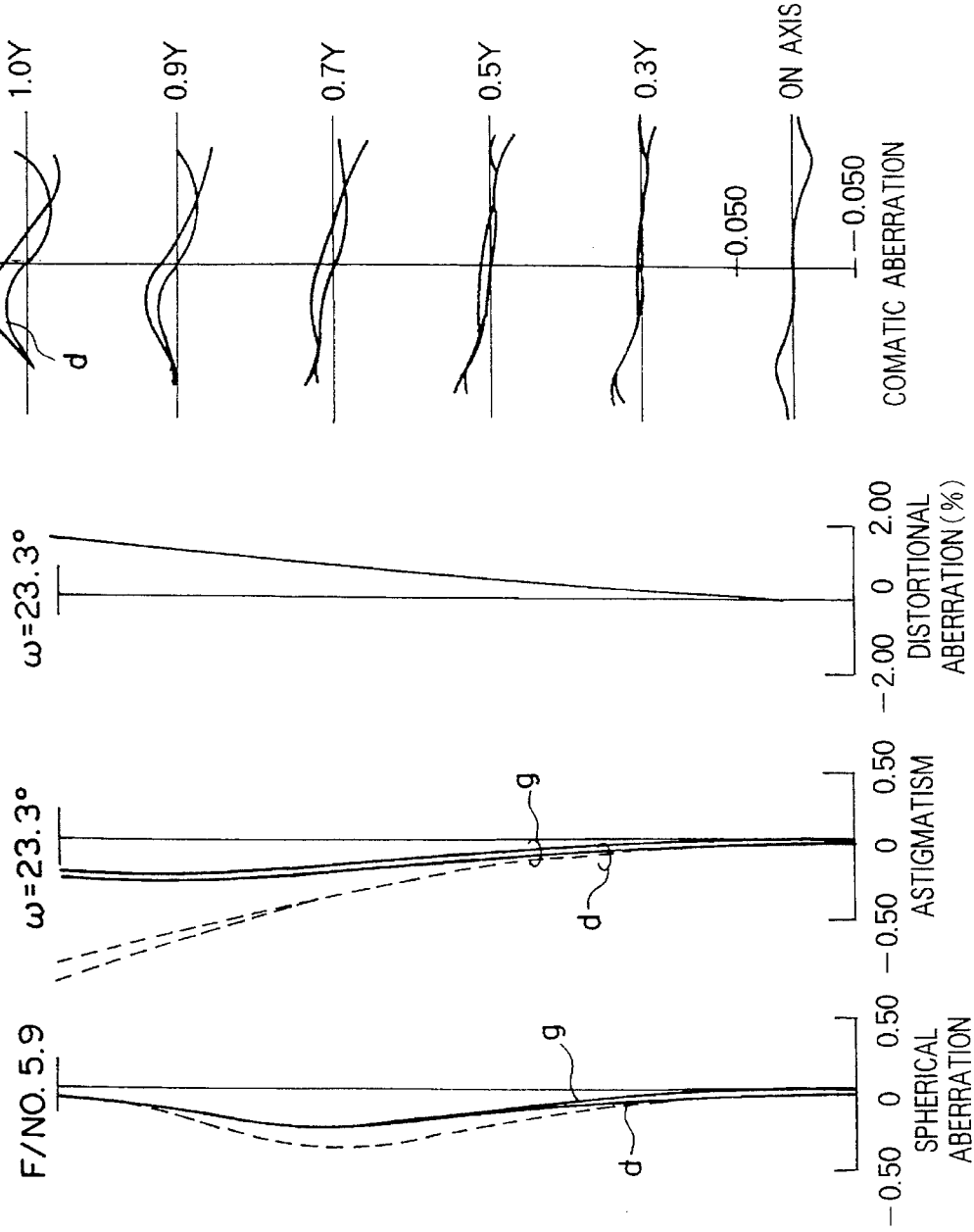

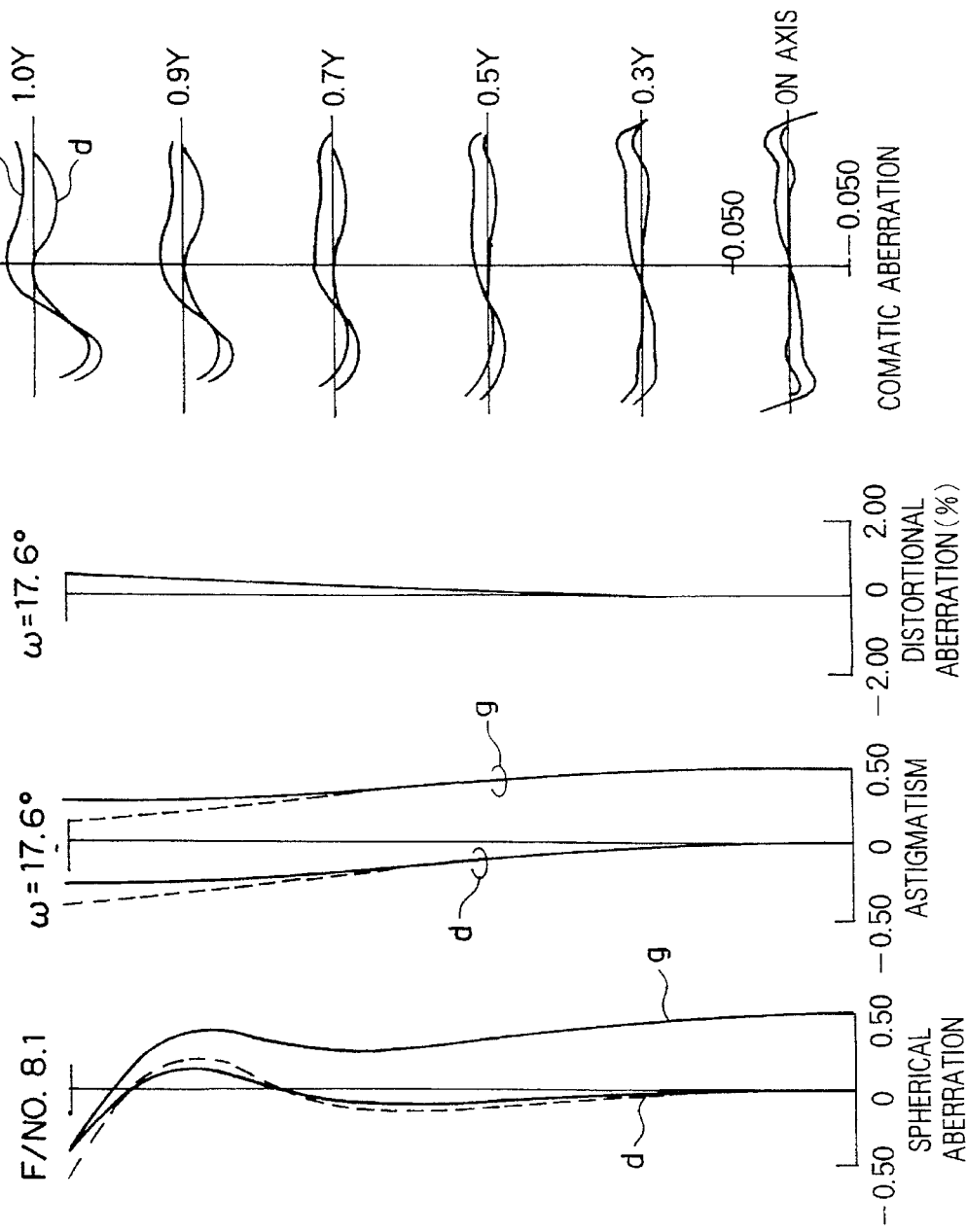

COMPACT ZOOM LENS

BACKGROUND OF THE INVENTION

1. Field of the Invention

The present invention relates to a zoom lens usable as a photographing lens of a lens shutter camera and a photographing lens of a video camera.

2. Description of the Related Art

Recently, a zoom lens has been mostly mounted onto a lens shutter camera. A new problem of how to make the camera having the zoom lens compact is caused.

When the camera is made compact, a maximum problem from a viewpoint of portability of the camera is to reduce a size of the camera in an optical axis direction of the zoom lens. Namely, this maximum problem is to make the zoom lens thin.

Recently, the lens shutter camera mounting the zoom lens thereon is made thin by increasing the number of stages in body tube. However, it is important to make the zoom lens itself thin. In particular, an entire length of the lens shutter camera at a long focal end (a distance from a lens front end to an image face) and an entire thickness of all movable lens groups at a most approaching time thereof (a distance from a lens front end to a lens rear end) are most important as a factor for determining thinness of the camera.

A zoom lens constructed by two lens groups as shown in Japanese Patent Application Laying Open (KOKAI) No. 5-11186 is generally known as a zoom lens having a relatively short length as the above entire lens length. A zoom lens constructed by two lens groups as shown in Japanese Patent Application Laying Open (KOKAI) No. 5-127082 is known as a zoom lens having a relatively thin thickness as the entire lens group thickness.

An entire length of the former zoom lens ranges from 0.96 to 0.92 times the focal length of an entire lens system at a long focal end so that this entire length of the former zoom lens is short. However, the entire lens group thickness of the former zoom lens is about 1.25 times the height of a maximum image. This entire lens group thickness is thick and is still insufficient to make the camera thin.

An entire lens group thickness of the latter zoom lens at a long focal end is approximately equal to the height of a maximum image so that the latter zoom lens is suitable for making the camera thin. However, a zoom ratio as an important factor is a small value such as about 1.6 magnifications so that the latter zoom lens is not necessarily practical.

SUMMARY OF THE INVENTION

It is therefore an object of the present invention to provide a compact zoom lens in which the number of lens groups is reduced to two and the zoom lens includes a wide half field angle equal to or greater than 30 degrees and has a zoom ratio close to two magnifications, but the number of constructional lenses is reduced to six, and an entire lens length at a long focal end is shorter than the focal length of an entire lens system at the long focal end, and an entire lens group thickness at the long focal end is equal to or shorter than 0.95 times the height of a maximum image.

In accordance with a first construction of the present invention, the above object can be achieved by a compact zoom lens in which a first lens group having a positive focal length is arranged on an object side and a second lens group having a negative focal length is arranged on an image side and a zooming operation is performed by changing a clearance between the first and second lens groups;

the first lens group being constructed by first, second, third and fourth lenses sequentially arranged from the object side such that the first lens is constructed by a positive meniscus lens having a convex face directed onto the object side;

the second lens is constructed by a negative meniscus lens having a convex face directed onto the image side;

the third lens is constructed by a positive meniscus lens having a convex face directed onto the image side; and the fourth lens is constructed by a positive lens having a face of large curvature directed onto the image side;

the second lens group being constructed by fifth and sixth lenses sequentially arranged from the object side such that the fifth lens is constructed by a positive meniscus lens having a convex face directed onto the image side; and the sixth lens is constructed by a negative meniscus lens having a convex face directed onto the image side;

the zoom lens being constructed such that an aperture stop is arranged just after the first lens group; and the following conditions $$0.60 < f_I/f_W < 0.75 \tag{1}$$

$$-1.10 < f_{II}/f_I < -0.90 \tag{2}$$

$$EP/f_W < 0.25 \tag{3}$$

$$AP_W/f_T > -0.16 \tag{4}$$

are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

In accordance with a fifth construction of the present invention, the above object can be also achieved by a compact zoom lens in which a first lens group having a positive focal length is arranged on an object side and a second lens group having a negative focal length is arranged on an image side and a zooming operation is performed by changing a clearance between the first and second lens groups;

the first lens group being constructed by first, second, third and fourth lenses sequentially arranged from the object side such that the first lens is constructed by a positive meniscus lens having a convex face directed onto the object side;

the second lens is constructed by a negative meniscus lens having a convex face directed onto the image side;

the third lens is constructed by a positive meniscus lens having a convex face directed onto the image side; and the fourth lens is constructed by a positive lens having a face of large curvature directed onto the image side;

the second lens group being constructed by fifth and sixth lenses sequentially arranged from the object side such that the fifth lens is constructed by a positive meniscus lens having a convex face directed onto the image side; and the sixth lens is constructed by a negative meniscus lens having a convex face directed onto the image side;

the zoom lens being constructed such that an aperture stop is arranged just after the first lens group;

an object side face of the fourth lens and an object side face of the fifth lens are constructed by aspherical surfaces; and the following conditions $$0.60 < f_I/f_W < 0.75 \quad (1)$$

$$-1.10 < f_{II}/f_I < -0.90 \quad (2)$$

$$EP/f_W < 0.25 \quad (3)$$

$$AP_W/f_T > -0.16 \quad (4)$$

are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

In accordance with an eighth construction of the present invention, the above object can be also achieved by a compact zoom lens in which a first lens group having a positive focal length is arranged on an object side and a second lens group having a negative focal length is arranged on an image side and a zooming operation is performed by changing a clearance between the first and second lens groups;

the first lens group being constructed by first, second, third and fourth lenses sequentially arranged from the object side such that the first lens is constructed by a positive meniscus lens having a convex face directed onto the object side;

the second lens is constructed by a negative meniscus lens having a convex face directed onto the image side;

the third lens is constructed by a positive meniscus lens having a convex face directed onto the image side; and the fourth lens is constructed by a positive lens having a face of large curvature directed onto the image side;

the second lens group being constructed by fifth and sixth lenses sequentially arranged from the object side such that the fifth lens is constructed by a positive meniscus lens having a convex face directed onto the image side; and the sixth lens is constructed by a negative meniscus lens having a convex face directed onto the image side;

the zoom lens being constructed such that an aperture stop is arranged just after the first lens group;

an object side face of the fourth lens and an image side face of the fifth lens are constructed by aspherical surfaces; and the following conditions $$0.60 < f_I/f_W < 0.75 \quad (1)$$

$$-1.10 < f_{II}/f_I < -0.90 \quad (2)$$

$$EP/f_W < 0.25 \quad (3)$$

$$AP_W/f_T > -0.16 \quad (4)$$

are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

In accordance with an eleventh construction of the present invention, the above object can be also achieved by a compact zoom lens in which a first lens group having a positive focal length is arranged on an object side and a second lens group having a negative focal length is arranged on an image side and a zooming operation is performed by changing a clearance between the first and second lens groups;

the first lens group being constructed by first, second, third and fourth lenses sequentially arranged from the object side such that the first lens is constructed by a positive meniscus lens having a convex face directed onto the object side;

the second lens is constructed by a negative meniscus lens having a convex face directed onto the image side;

the third lens is constructed by a positive meniscus lens having a convex face directed onto the image side; and the fourth lens is constructed by a positive lens having a face of large curvature directed onto the image side;

the second lens group being constructed by fifth and sixth lenses sequentially arranged from the object side such that the fifth lens is constructed by a positive meniscus lens having a convex face directed onto the image side; and the sixth lens is constructed by a negative meniscus lens having a convex face directed onto the image side;

the zoom lens being constructed such that an aperture stop is arranged just after the first lens group;

an object side face of the fourth lens and an object side face and an image side face of the fifth lens are constructed by aspherical surfaces; and the following conditions $$0.60 < f_I/f_W < 0.75 \quad (1)$$

$$-1.10 < f_{II}/f_I < -0.90 \quad (2)$$

$$EP/f_W < 0.25 \quad (3)$$

$$AP_W/f_T > -0.16 \quad (4)$$

are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

In each of the above constructions, the number of lens groups is reduced to two and the zoom lens includes a wide half field angle equal to or greater than 30 degrees and has a zoom ratio close to two magnifications, but the number of constructional lenses is reduced to six. Further, the entire lens length at the long focal end is shorter than the focal length of the entire lens system at the long focal end, and an entire lens group thickness at the long focal end is equal to or shorter than 0.95 times the height of a maximum image.

Further objects and advantages of the present invention will be apparent from the following description of the preferred embodiments of the present invention as illustrated in the accompanying drawings.

BRIEF DESCRIPTION OF THE DRAWINGS

FIG. 6a is a diagram showing spherical aberration at a short focal end of the zoom lens in the embodiment 1;

FIG. 6b is a diagram showing astigmatism at the short focal end of the zoom lens in the embodiment 1;

FIG. 6c is a diagram showing distortional aberration at the short focal end of the zoom lens in the embodiment 1;

FIG. 6d is a diagram showing comatic aberration at the short focal end of the zoom lens in the embodiment 1;

FIG. 7a is a diagram showing spherical aberration at an intermediate focal length of the zoom lens in the embodiment 1;

FIG. 7b is a diagram showing astigmatism at the intermediate focal length of the zoom lens in the embodiment 1;

FIG. 7c is a diagram showing distortional aberration at the intermediate focal length of the zoom lens in the embodiment 1;

FIG. 7d is a diagram showing comatic aberration at the intermediate focal length of the zoom lens in the embodiment 1;

FIG. 8a is a diagram showing spherical aberration at a long focal end of the zoom lens in the embodiment 1;

FIG. 8b is a diagram showing astigmatism at the long focal end of the zoom lens in the embodiment 1;

FIG. 8c is a diagram showing distortional aberration at the long focal end of the zoom lens in the embodiment 1;

FIG. 8d is a diagram showing comatic aberration at the long focal end of the zoom lens in the embodiment 1;

FIG. 9a is a diagram showing spherical aberration at a short focal end of the zoom lens in the embodiment 2;

FIG. 9b is a diagram showing astigmatism at the short focal end of the zoom lens in the embodiment 2;

FIG. 9c is a diagram showing distortional aberration at the short focal end of the zoom lens in the embodiment 2;

FIG. 9d is a diagram showing comatic aberration at the short focal end of the zoom lens in the embodiment 2;

FIG. 10a is a diagram showing spherical aberration at an intermediate focal length of the zoom lens in the embodiment 2;

FIG. 10b is a diagram showing astigmatism at the intermediate focal length of the zoom lens in the embodiment 2;

FIG. 10c is a diagram showing distortional aberration at the intermediate focal length of the zoom lens in the embodiment 2;

FIG. 10d is a diagram showing comatic aberration at the intermediate focal length of the zoom lens in the embodiment 2;

FIG. 11a is a diagram showing spherical aberration at a long focal end of the zoom lens in the embodiment 2;

FIG. 11b is a diagram showing astigmatism at the long focal end of the zoom lens in the embodiment 2;

FIG. 11c is a diagram showing distortional aberration at the long focal end of the zoom lens in the embodiment 2;

FIG. 11d is a diagram showing comatic aberration at the long focal end of the zoom lens in the embodiment 2;

FIG. 12a is a diagram showing spherical aberration at a short focal end of the zoom lens in the embodiment 3;

FIG. 12b is a diagram showing astigmatism at the short focal end of the zoom lens in the embodiment 3;

FIG. 12c is a diagram showing distortional aberration at the short focal end of the zoom lens in the embodiment 3;

FIG. 12d is a diagram showing comatic aberration at the short focal end of the zoom lens in the embodiment 3;

FIG. 13a is a diagram showing spherical aberration at an intermediate focal length of the zoom lens in the embodiment 3;

FIG. 13b is a diagram showing astigmatism at the intermediate focal length of the zoom lens in the embodiment 3;

FIG. 13c is a diagram showing distortional aberration at the intermediate focal length of the zoom lens in the embodiment 3;

FIG. 13d is a diagram showing comatic aberration at the intermediate focal length of the zoom lens in the embodiment 3;

FIG. 14a is a diagram showing spherical aberration at a long focal end of the zoom lens in the embodiment 3;

FIG. 14b is a diagram showing astigmatism at the long focal end of the zoom lens in the embodiment 3;

FIG. 14c is a diagram showing distortional aberration at the long focal end of the zoom lens in the embodiment 3;

FIG. 14d is a diagram showing comatic aberration at the long focal end of the zoom lens in the embodiment 3;

FIG. 15a is a diagram showing spherical aberration at a short focal end of the zoom lens in the embodiment 4;

FIG. 15b is a diagram showing astigmatism at the short focal end of the zoom lens in the embodiment 4;

FIG. 15c is a diagram showing distortional aberration at the short focal end of the zoom lens in the embodiment 4;

FIG. 15d is a diagram showing comatic aberration at the short focal end of the zoom lens in the embodiment 4;

FIG. 16a is a diagram showing spherical aberration at an intermediate focal length of the zoom lens in the embodiment 4;

FIG. 16b is a diagram showing astigmatism at the intermediate focal length of the zoom lens in the embodiment 4;

FIG. 16c is a diagram showing distortional aberration at the intermediate focal length of the zoom lens in the embodiment 4;

FIG. 16d is a diagram showing comatic aberration at the intermediate focal length of the zoom lens in the embodiment 4;

FIG. 17a is a diagram showing spherical aberration at a long focal end of the zoom lens in the embodiment 4;

FIG. 17b is a diagram showing astigmatism at the long focal end of the zoom lens in the embodiment 4;

FIG. 17c is a diagram showing distortional aberration at the long focal end of the zoom lens in the embodiment 4;

FIG. 17d is a diagram showing comatic aberration at the long focal end of the zoom lens in the embodiment 4;

FIG. 18a is a diagram showing spherical aberration at a short focal end of the zoom lens in the embodiment 5;

FIG. 18b is a diagram showing astigmatism at the short focal end of the zoom lens in the embodiment 5;

FIG. 18c is a diagram showing distortional aberration at the short focal end of the zoom lens in the embodiment 5;

FIG. 18d is a diagram showing comatic aberration at the short focal end of the zoom lens in the embodiment 5;

FIG. 19a is a diagram showing spherical aberration at an intermediate focal length of the zoom lens in the embodiment 5;

FIG. 19b is a diagram showing astigmatism at the intermediate focal length of the zoom lens in the embodiment 5;

FIG. 19c is a diagram showing distortional aberration at the intermediate focal length of the zoom lens in the embodiment 5;

FIG. 19d is a diagram showing comatic aberration at the intermediate focal length of the zoom lens in the embodiment 5;

FIG. 20a is a diagram showing spherical aberration at a long focal end of the zoom lens in the embodiment 5;

FIG. 20b is a diagram showing astigmatism at the long focal end of the zoom lens in the embodiment 5;

FIG. 20c is a diagram showing distortional aberration at the long focal end of the zoom lens in the embodiment 5; and FIG. 20d is a diagram showing comatic aberration at the long focal end of the zoom lens in the embodiment 5.

DESCRIPTION OF THE PREFERRED EMBODIMENTS

The preferred embodiments of a compact zoom lens in the present invention will next be described in detail with reference to the accompanying drawings.

Figure 1:
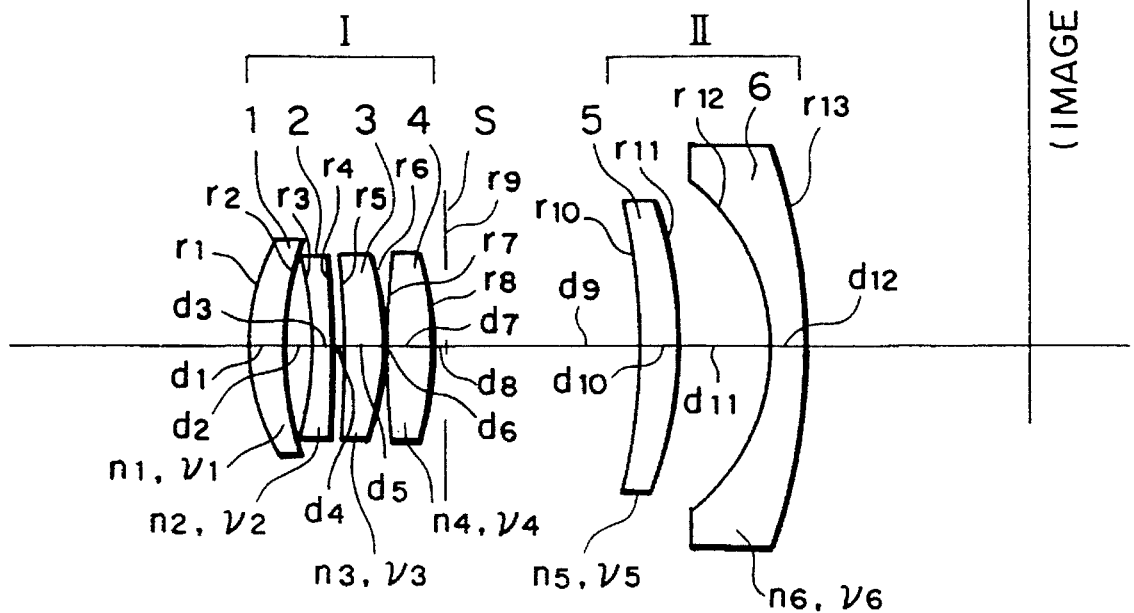
FIG. 1 is a view showing the construction of a zoom lens in accordance with an embodiment 1 of the present invention.

As shown in FIG. 1, in the compact zoom lens of a first construction of the present invention, a first lens group I having a positive focal length is arranged on an object side (on a left-hand side in FIG. 1). A second lens group II having a negative focal length is arranged on an image side (on a right-hand side in FIG. 1). A zooming operation of the zoom lens is performed by changing a clearance between the first and second lens groups.

The first lens group I is constructed by first, second, third and fourth lenses 1 to 4 sequentially arranged from the object side. The first lens 1 is constructed by a positive meniscus lens having a convex face directed onto the object side. The second lens 2 is constructed by a negative meniscus lens having a convex face directed onto the image side. The third lens 3 is constructed by a positive meniscus lens having a convex face directed onto the image side. The fourth lens 4 is constructed by a positive lens having a face of large curvature directed onto the image side.

The second lens group II is constructed by fifth and sixth lenses 5, 6 sequentially arranged from the object side. The fifth lens 5 is constructed by a positive meniscus lens having a convex face directed onto the image side. The sixth lens 6 is constructed by a negative meniscus lens having a convex face directed onto the image side.

An aperture stop S is arranged just after the first lens group I.

The following conditions (1) to (4)

$$0.60 < f_I/f_W < 0.75 \quad (1)$$

$$-1.10 < f_{II}/f_I < -0.90 \quad (2)$$

$$EP/f_W < 0.25 \quad (3)$$

$$AP_W/f_T > -0.16 \quad (4)$$

are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

The compact zoom lens of the present invention has the above basic construction.

In accordance with a second construction of the present invention, one face or more of the first lens group and one face or more of the second lens group are constructed by aspherical surfaces.

In accordance with a third construction of the present invention, at least one of the aspherical surfaces in the first lens group has a shape formed such that positive refracting power is weakened or negative refracting power is strengthened from an optical axis of the first lens group toward a peripheral portion thereof.

In accordance with a fourth construction of the present invention, at least one of the aspherical surfaces in the second lens group has a shape formed such that positive refracting power is strengthened or negative refracting power is weakened from an optical axis of the second lens group toward a peripheral portion thereof.

In a fifth construction of the compact zoom lens of the present invention, portions using the aspherical surfaces are specified in the second construction. Namely, an object side face of the fourth lens in the first lens group and an object side face of the fifth lens in the second lens group are constructed by aspherical surfaces.

In accordance with a sixth construction of the present invention, the following condition $$X_7(H) < c_7 H^2/\{1 + \sqrt{(1 - c_7^2 H^2)}\ \} \quad (10)$$

is satisfied in the fifth construction when H is a distance from an optical axis of the fourth lens to the object side face thereof;

$X_7(H)$ is a distance from a tangential plane on the optical axis in a position of H and is set such that a direction from the object side to the image side is positive; and $c_7$ is a paraxial curvature of the object side face of the fourth lens.

In accordance with a seventh construction of the present invention, the following condition $$X_{10}(H) > c_{10}H^2 / \left\{ 1 + \sqrt{(1 - c_{10}^2 H^2)} \right\} \quad (11)$$

is satisfied in the fifth or sixth construction when H is a distance from an optical axis of the fifth lens to the object side face thereof;

$X_{10}(H)$ is a distance from a tangential plane on the optical axis in a position of H and is set such that a direction from the object side to the image side is positive; and $c_{10}$ is a paraxial curvature of the object side face of the fifth lens.

In accordance with an eighth construction of the present invention, an object side face of the fourth lens and an image side face of the fifth lens in the second construction are constructed by aspherical surfaces.

In accordance with a ninth construction of the present invention, an aspherical shape of the object side face of the fourth lens in the eighth construction satisfies the above condition (10).

In accordance with a tenth construction of the present invention, the following condition $$X_{11}(H) < c_{11}H^2 / \left\{ 1 + \sqrt{(1 - c_{11}^2 H^2)} \right\} \quad (12)$$

is satisfied when H is a distance from an optical axis of the fifth lens to the image side face thereof;

$X_{11}(H)$ is a distance from a tangential plane on the optical axis in a position of H and is set such that a direction from the object side to the image side is positive; and $c_{11}$ is a paraxial curvature of the image side face of the fifth lens.

In accordance with an eleventh construction of the present invention, an object side face of the fourth lens and an object side face and an image side face of the fifth lens in the above second construction are constructed by aspherical surfaces.

In accordance with a twelfth construction of the present invention, an aspherical shape of the object side face of the fourth lens in the eleventh construction satisfies the above condition (10). In accordance with a thirteenth construction of the present invention, the above values $X_{10}(H)$, $c_{10}$, $X_{11}(H)$ and $c_{11}$ with respect to the fifth lens satisfy the following condition.

$$X_{11}(H) - X_{10}(H) < \left[ c_{11}H^2 / \left\{ 1 + \sqrt{(1 - c_{11}^2 H^2)} \right\} \right] - \left[ c_{10}H^2 / \left\{ 1 + \sqrt{(1 - c_{10}^2 H^2)} \right\} \right] \quad (13)$$

In accordance with a fourteenth construction of the present invention, the following conditions (5) and (6)

$0.75 < f_4/f_f < 0.95$ (5)

$0.08 < d_{11}/f_W < 0.14$ (6)

are satisfied in one of the first to thirteenth constructions when $f_4$ is a focal length of the fourth lens; and $d_{11}$ is a face distance on the optical axis between the image side face of the fifth lens and an object side face of the sixth lens.

In accordance with a fifteenth construction of the present invention, the following conditions (7), (8) and (9)

$n_2 > 1.75$ (7)

$n_6 > 1.70$ (8)

$v_6 > 40.0$ (9)

are satisfied in one of the first to thirteenth constructions when $n_2$ is a refractive index of a material of the second lens;

$n_6$ is a refractive index of a material of the sixth lens; and $v_6$ is an Abbe's number of the sixth lens.

As mentioned above, in the present invention, the first lens group having a positive focal length is arranged on an object side and the second lens group having a negative focal length is arranged on an image side so that a two-group zoom lens of a so-called telephoto type is formed. In this construction, a back focus is shortened and it is possible to realize a compact zoom lens which is simply constructed and is suitable for a camera such as a lens shutter camera having a small number of restrictions with respect to the back focus.

In the zoom lens of the above type, the first and second lens groups approach each other most at a long focal end and the back focus becomes shortest at a short focal end. In the present invention, the first lens group is constructed by positive, negative, positive and positive lenses sequentially arranged from an object side. Accordingly, a rear side principal point of the first lens group is located on the image side as much as possible. A distance between the rear side principal point of the first lens group and a front side principal point of the second lens group at the long focal end is effectively shortened so that a large zoom ratio can be obtained.

Each of the second and third lenses in the first lens group is constructed by a meniscus lens so that each of the second and third lenses independently has a positive refracting power face and a negative refracting power face. Accordingly, aberrations caused on the object side are compensated to a certain extent on the image side so that no high accuracy is required with respect to eccentricity and face clearances between the lenses.

The aperture stop is not arranged in the first lens group, but is arranged just after the first lens group. Accordingly, a shutter unit having a low position accuracy in comparison with lenses can be arranged separately from the first lens group.

When an entire length of the zoom lens of this type is shortened, it is necessary to strengthen refracting power of each of the first and second lens groups. However, when the refracting power of each of the first and second lens groups is excessively strengthened, optical performance of the zoom lens is greatly reduced when eccentricity of each of the lens groups is caused. Further, refracting power of each of the lenses within the lens groups is also strengthened. Therefore, position accuracies between these lenses become strict so that no lens system is easily assembled.

The condition (1) prescribes the refracting power of the first lens group. When $f_f/f_W$ in the condition (1) exceeds an upper limit, it is difficult to set the entire length of the first lens group at the long focal end to be shorter than the focal length of the entire lens system at the long focal end. In contrast to this, when the $f_f/f_W$ in the condition (1) exceeds a lower limit, the refracting power of the first lens group is excessively increased so that position accuracies between the lenses of the first lens group become strict. Therefore, an assembly adjusting operation with high accuracy is required so that yield is reduced and cost of the zoom lens is increased.

The lens shutter camera has a small number of restrictions with respect to the back focus as mentioned above. However, if the back focus is limitlessly reduced, a diameter of the second lens group system is increased and images of dust, etc. attached onto a final lens face are unpreferably photographed on a film.

It is important to reduce moving amounts of the respective lens groups at a zooming time so as to set the entire lens length at the long focal end to be shorter than the focal length of the entire lens system at the long focal end and secure the back focus to a certain extent at the short focal end.

It is necessary to set the negative refracting power of the second lens group to be approximately equal to or stronger than the positive refracting power of the first lens group so as to restrict a displacing amount of the second lens group relative to the first lens group at the zooming time.

The condition (2) prescribes a ratio of the refracting powers of the first and second lens groups. When $f_{II}/f_I$ in the condition (2) exceeds a lower limit, the refracting power of the second lens group becomes weaker than that of the first lens group so that the displacing amount of the second lens group relative to the first lens group is increased. Accordingly, the back focus is shortened on a short focal side so that a diameter of the second lens group is increased.

In contrast to this, when $f_{II}/f_I$ in the condition (2) exceeds an upper limit, the refracting power of the second lens group is excessively increased in comparison with the refracting power of the first lens group so that a Petzval's sum is excessively reduced. Therefore, an image face is inclined on a positive side so that optical performance outside the optical axis is reduced.

An object of the present invention is to reduce the entire lens length and the entire lens group thickness as a distance from a lens front end at a long focal end to a lens rear end. It is important to make each of the first and second lens groups thin to achieve this object.

The conditions (3) and (4) are conditions for restricting the positions of entrance and exit pupils of the lens system.

When $EP/f_W$ in the condition (3) exceeds an upper limit, the length of the first lens group is increased. When $AP_W/f_T$ in the condition (4) exceeds a lower limit, the length of the second lens group is increased. The entire lens group thickness can be set to be equal to or smaller than 0.95 times the height of a maximum image by simultaneously satisfying these conditions (3) and (4).

In the lens construction of the present invention, $EP/f_W$ is desirably equal to or greater than 0.2 and $AP_W/f_T$ is desirably equal to or smaller than $-0.12$ in consideration of balance of required aberrational corrections.

In the compact zoom lens having each of the second to thirteenth constructions of the present invention, the first lens group has one aspherical surface or more and the second lens group has one aspherical surface or more.

The aspherical surface used within the first lens group mainly contributes to a correction of spherical aberration. The aspherical surface used within the second lens group mainly contributes to corrections of field curvature and astigmatism.

In the third construction of the present invention, one aspherical surface or more used within the first lens group have a shape formed such that positive refracting power is weakened or negative refracting power is strengthened from an optical axis of the first lens group toward a peripheral portion thereof. Accordingly, spherical aberration caused by making the first lens group thin can be more effectively removed by using such a shape.

In the fourth construction of the present invention, one aspherical surface or more used within the second lens group have a shape formed such that positive refracting power is strengthened or negative refracting power is weakened from an optical axis of the second lens group toward a peripheral portion thereof. Accordingly, field curvature and astigmatism caused by shortening the entire lens length can be more effectively removed by using such a shape.

In the compact zoom lens having each of the fifth, eighth and eleventh constructions of the present invention, an aspherical surface is used as an object side face of the fourth lens in the first lens group.

The condition (10) in each of the sixth, ninth and twelfth constructions of the present invention prescribes a shape of the aspherical surface used on an object side of the fourth lens. This shape of the aspherical surface shows that positive refracting power is weakened from the optical axis toward a peripheral portion of the fourth lens. Spherical aberration caused by making the first lens group thin can be more effectively removed by using such a shape.

In the compact zoom lens having the fifth construction of the present invention, an aspherical surface is used as an object side face of the fifth lens in the second lens group.

The condition (11) in the seventh construction of the present invention shows that the aspherical surface as the object side face of the fifth lens has a shape for weakening negative refracting power from the optical axis toward a peripheral portion of the fifth lens. Field curvature and astigmatism caused by shortening the entire lens length can be more effectively removed by using such a shape.

In the compact zoom lens having the eighth construction of the present invention, an aspherical surface is used as an image side face of the fifth lens in the second lens group.

The condition (12) in the tenth construction of the present invention shows that the aspherical surface as the image side face of the fifth lens has a shape for strengthening positive refracting power from the optical axis toward a peripheral portion of the fifth lens. Field curvature and astigmatism caused by shortening the entire lens length can be more effectively removed by using such a shape.

In the compact zoom lens having the eleventh construction of the present invention, an aspherical surface is used as each of an object side face and an image side face of the fifth lens in the second lens group.

The condition (13) in the thirteenth construction of the present invention shows that the fifth lens has a shape for strengthening positive refracting power from the optical axis toward a peripheral portion of the fifth lens. Both the object side face and the image side face of the fifth lens have such a shape as the aspherical surface. Field curvature and astigmatism caused by shortening the entire lens length can be more effectively removed by using such a shape.

In the compact zoom lens having each of the first to thirteenth constructions of the present invention, it is preferable to satisfy the conditions (5) and (6) in the fourteenth construction.

The condition (5) restricts an occupying ratio of refracting power of the fourth lens to refracting power of the first lens group. When $f_4/f_I$ in the condition (5) exceeds a lower limit, optical performance of the fourth lens caused by eccentricity is greatly reduced. In contrast to this, when $f_4/f_I$ in the condition (5) exceeds an upper limit, aberrations within the first lens group are insufficiently corrected so that aberrational performance of the entire lens system is reduced.

The condition (6) restricts a clearance on the optical axis between the image side face of the fifth lens and an object side face of the sixth lens. When $d_{11}/f_W$ in the condition (6) exceeds an upper limit, spherical aberration in a long focal region is insufficiently corrected. In contrast to this, when $d_{11}/f_W$ in the condition (6) exceeds a lower limit, spherical aberration in the long focal region is excessively corrected.

Accordingly, spherical aberration and field curvature are unbalanced in a range outside the condition (6).

It is desirable to satisfy the conditions (7), (8) and (9) as in the fifteenth construction of the present invention to make preferable corrections of chromatic aberration and field curvature consistent with each other.

The condition (7) restricts a refractive index of a material of the second lens. The condition (8) restricts a refractive index of a material of the six lens. The condition (9) restricts an Abbe's number of the sixth lens. A higher image forming performance can be obtained by satisfying these conditions (7), (8) and (9).

Concrete embodiments of the present invention will next be described.

In all the embodiments, as shown in FIG. 1, $r_i$ (i=1 to 13) is set to a radius of curvature of an i-th face (including a diaphragm face) counted from an object side. $d_i$ (i=1 to 12) is set to a face distance on the optical axis of an optical system between the i-th face and an (i+1)-th face. $n_j$ and $v_j$ (j=1 to 6) are respectively set to a refractive index of a material of a j-th lens counted from the object side and an Abbe's number of the j-th lens.

Further, f is set to a focal length of the entire optical system and F/No shows brightness of the optical system. $\omega$ is set to a half field angle.

In the following description, an X-coordinate is set to be in conformity with the optical axis and an H-coordinate is set to be perpendicular to the optical axis. Further, r is set to a radius of curvature of an aspherical surface on the optical axis. This curvature radius r is equal to an inverse number of the above-mentioned value c. K is set to a conical constant and A, B, C and D are set to aspherical coefficients of higher orders. In this case, as well is known, the aspherical surface is a curved surface obtained by rotating a curve represented by the following formula around the optical axis.

$$X = (1/r)H^2/\{1 + \sqrt{[1-(1+K)(H/r)^2]}\} + A \cdot H^4 + B \cdot H^6 + C \cdot H^8 + D \cdot H^{10}$$

A shape of the aspherical surface is specified by providing the curvature radius r on the optical axis, the conical constant K and the aspherical coefficients A, B, C and D of higher orders. In notation of the aspherical coefficients, E and a number subsequent to this E show a power. For example, "E-9" means $1/10^9$ and this value $1/10^9$ is multiplied by a numeric value before this value $1/10^9$.

The conditions (7), (8) and (9) among the conditional formulas (1) to (13) are clearly satisfied from numeric values in each of the embodiments. The conditions (10) to (13) are also satisfied in each of the embodiments. Accordingly, the values of parameters in the conditional formulas are provided with respect to the conditions (1) to (6).

Embodiment 1

$f=36.0\sim67.9$, $F/No=4.5\sim8.5$, $\omega=30.3°\sim17.6°$

| i | $r_i$ | $d_i$ | j | $n_j$ | $v_j$ |
|---|---|---|---|---|---|
| 1 | 11.331 | 1.83 | 1 | 1.53172 | 48.84 |
| 2 | 18.864 | 1.36 | | | |
| 3 | 12.838 | 1.00 | 2 | 1.80610 | 33.27 |
| 4 | −115.806 | 0.47 | | | |
| 5 | −45.131 | 2.17 | 3 | 1.51823 | 58.96 |
| 6 | −15.633 | 0.10 | | | |

-continued

| i | $r_i$ | $d_i$ | j | $n_j$ | $v_j$ |
|---|---|---|---|---|---|
| 7 | 44.616 | 2.40 | 4 | 1.51680 | 64.20 |
| 8 | −13.500 | 0.50 | | | |
| 9 | (diaphragm) | variable | | | |
| 10 | −23.332 | 1.88 | 5 | 1.80518 | 25.46 |
| 11 | −18.102 | 4.52 | | | |
| 12 | −9.847 | 1.50 | 6 | 1.74330 | 49.22 |
| 13 | −36.272 | | | | |

Aspherical surfaces

Seventh Face:
K=0.84283,
A=−1.03991E−4, B=7.35304E−8,
C=−4.49879E−8, D=1.11550E−9

Tenth Face:
K=4.13513,
A=8.64254E−5, B=5.31203E−7,
C=5.08220E−9, D=7.46982E−12 variable amounts:

| f | 35.959 | 49.474 | 67.896 |
|---|---|---|---|
| $d_9$ | 9.773 | 5.418 | 2.274 | values of parameters in conditional formulas:

$f_1/f_W=0.660$, $f_{II}/f_I=-1.017$, $EP/f_W=0.213$, $AP_W/f_I=-0.151$, $f_4/f_I=0.857$, $d_{11}/f_W=0.126$

FIG. 1 shows the construction of a zoom lens in accordance with the embodiment 1.

Embodiment 2

$f=36.1\sim67.9$, $F/No=4.5\sim8.5$, $\omega=30.2°\sim17.6°$

| i | $r_i$ | $d_i$ | j | $n_j$ | $v_j$ |
|---|---|---|---|---|---|
| 1 | 11.580 | 1.82 | 1 | 1.53172 | 48.84 |
| 2 | 19.642 | 1.37 | | | |
| 3 | −12.337 | 1.69 | 2 | 1.80610 | 33.27 |
| 4 | −54.331 | 0.35 | | | |
| 5 | −25.437 | 1.73 | 3 | 1.48749 | 70.44 |
| 6 | −12.596 | 0.10 | | | |
| 7 | 51.698 | 2.31 | 4 | 1.51680 | 64.20 |
| 8 | −14.640 | 0.50 | | | |
| 9 | (diaphragm) | variable | | | |
| 10 | −25.013 | 1.96 | 5 | 1.80518 | 25.46 |
| 11 | −18.525 | 4.39 | | | |
| 12 | −10.284 | 1.50 | 6 | 1.74330 | 49.22 |
| 13 | −41.493 | | | | |

Aspherical surfaces

Seventh Face:
K=6.49367,
A=−9.42612E−5, B=−6.47699E−7,
C=2.38169E−8, D=−5.99239E−10

Tenth Face:
K=3.06249,
A=6.50446E−5, B=3.85475E−7,

C=2.99810E–9, D=–5.52040E–12
variable amounts:

| f | 36.065 | 49.504 | 67.950 |
|---|---|---|---|
| $d_9$ | 10.308 | 5.666 | 2.248 | values of parameters in conditional formulas:

$f_1/f_W=0.676, f_{II}/f_T=-1.038, EP/f_W=0.210, AP_W/f_T=-0.154, f_4/f_T=0.917, d_{11}/f_W=0.122$

Figure 2:
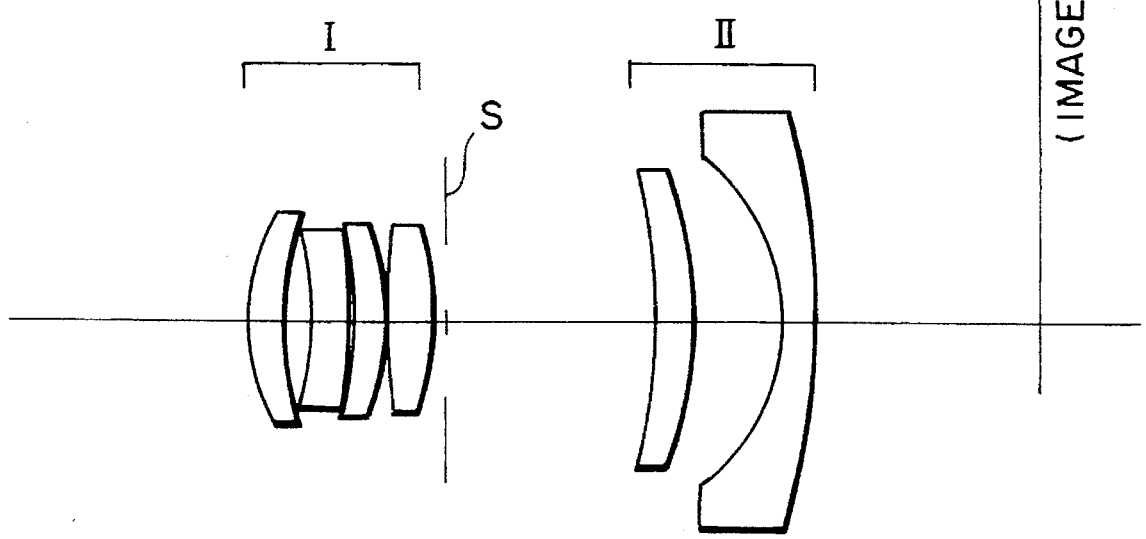
FIG. 2 is a view showing the construction of a zoom lens in accordance with an embodiment 2 of the present invention.

FIG. 2 shows the construction of a zoom lens in accordance with the embodiment 2.

Embodiment 3

$f=36.1\sim67.9, F/No=4.5\sim8.5,$ $=30.2°\sim17.6°$

| i | $r_i$ | $d_i$ | j | $n_j$ | $v_j$ |
|---|---|---|---|---|---|
| 1 | 12.728 | 1.81 | 1 | 1.58144 | 40.89 |
| 2 | 20.087 | 1.27 | | | |
| 3 | –14.856 | 1.43 | 2 | 1.84666 | 23.78 |
| 4 | –39.595 | 1.36 | | | |
| 5 | –38.664 | 1.98 | 3 | 1.64769 | 33.84 |
| 6 | –25.250 | 0.10 | | | |
| 7 | 81.561 | 2.18 | 4 | 1.58913 | 61.25 |
| 8 | –15.917 | 0.50 | | | |
| 9 | (diaphragm) | variable | | | |
| 10 | –38.512 | 2.38 | 5 | 1.62004 | 36.30 |
| 11 | –18.695 | 3.48 | | | |
| 12 | –10.927 | 1.50 | 6 | 1.77250 | 49.62 |
| 13 | –60.413 | | | | |

Aspherical surfaces

Seventh Face:
K=46.84957,
A=–7.82543E–5, B=3.07436E–7,
C=–4.52666E–8, D=9.44724E–10
Tenth Face:
K=3.37913,
A=5.79062E–5, B=–2.00496E–7,
C=1.23959E–8, D=–8.99690E–11
variable amounts:

| f | 36.046 | 49.470 | 67.896 |
|---|---|---|---|
| $d_9$ | 10.749 | 5.688 | 2.000 | values of parameters in conditional formulas:

$f_1/f_W=0.695, f_{II}/f_T=-1.070, EP/f_W=0.228, AP_W/f_T=-0.152, f_4/f_T=0.909, d_{11}/f_W=0.097$

Figure 3:
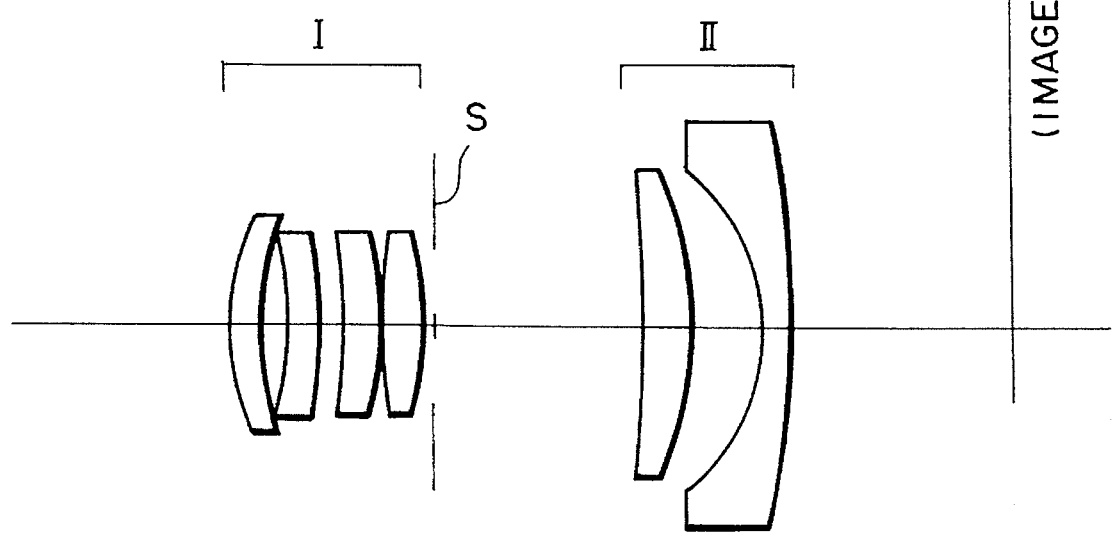
FIG. 3 is a view showing the construction of a zoom lens in accordance with an embodiment 3 of the present invention.

FIG. 3 shows the construction of a zoom lens in accordance with the embodiment 3.

Embodiment 4

$f=36.1\sim67.9, F/No=4.4\sim8.3,$ $\omega=30.2°\sim17.6°$

| i | $r_i$ | $d_i$ | j | $n_j$ | $v_j$ |
|---|---|---|---|---|---|
| 1 | 9.972 | 1.86 | 1 | 1.51823 | 58.96 |
| 2 | 14.091 | 1.47 | | | |
| 3 | –13.970 | 1.00 | 2 | 1.84666 | 23.78 |
| 4 | –35.184 | 1.06 | | | |
| 5 | –24.610 | 1.35 | 3 | 1.48749 | 70.44 |
| 6 | –21.717 | 0.10 | | | |
| 7 | 47.874 | 2.36 | 4 | 1.54814 | 45.82 |
| 8 | –12.981 | 0.50 | | | |
| 9 | (diaphragm) | variable | | | |
| 10 | –37.549 | 2.69 | 5 | 1.58144 | 40.89 |
| 11 | –16.935 | 3.44 | | | |
| 12 | –9.728 | 1.50 | 6 | 1.77250 | 49.62 |
| 13 | –49.311 | | | | |

Aspherical surfaces

Seventh Face:
K=1.05871,
A=–1.26916E–4, B=–1.65443E–6,
C=6.28168E–8, D=–1.25613E–9
Eleventh Face:
K=0.62211,
A=–4.37016E–5, B=–1.04869E–6,
C=1.06890E–8, D=–1.65428E–10
variable amounts:

| f | 36.054 | 49.476 | 67.897 |
|---|---|---|---|
| $d_9$ | 10.006 | 5.435 | 2.104 | values of parameters in conditional formulas:

$f_1/f_W=0.684, f_{II}/f_T=-0.999, EP/f_W=0.224, AP_W/f_T=-0.144, f_4/f_T=0.766, d_{11}/f_W=0.095$

Figure 4:
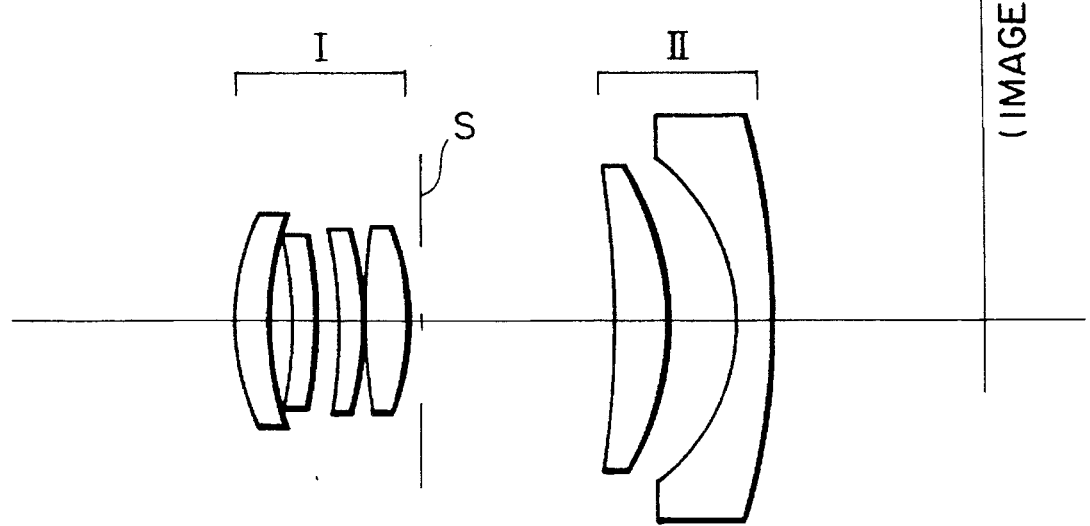
FIG. 4 is a view showing the construction of a zoom lens in accordance with an embodiment 4 of the present invention.

FIG. 4 shows the construction of a zoom lens in accordance with the embodiment 4.

Embodiment 5

$f=36.1\sim67.9, F/No=4.3\sim8.1,$ $=30.2°\sim17.6°$

| i | $r_i$ | $d_i$ | j | $n_j$ | $v_j$ |
|---|---|---|---|---|---|
| 1 | 9.842 | 2.05 | 1 | 1.48749 | 70.44 |
| 2 | 16.064 | 1.39 | | | |
| 3 | –14.639 | 1.00 | 2 | 1.80610 | 33.27 |
| 4 | –98.553 | 0.80 | | | |
| 5 | –89.712 | 1.56 | 3 | 1.48749 | 70.44 |
| 6 | –25.735 | 0.50 | | | |
| 7 | 36.247 | 2.39 | 4 | 1.51823 | 58.96 |
| 8 | –13.007 | 0.50 | | | |
| 9 | (diaphragm) | variable | 5 | 1.80518 | 25.46 |
| 10 | –37.397 | 1.78 | | | |
| 11 | –25.834 | 4.32 | | | |
| 12 | –8.753 | 1.50 | 6 | 1.74330 | 49.22 |
| 13 | –30.326 | | | | |

Aspherical surfaces

Seventh Face:
K=–12.83811,
A=–1.23337E–4, B=6.13818E–7,
C=–1.07798E–7, D=2.66752E–9
Tenth Face:

K=−10.46612,

A=9.85754E−5, B=−2.59363E−6,

C=1.39722E−7, D=−9.37474E−10

Eleventh Face:

K=−4.46342,

A=8.84954E−6, B=−1.91889E−6,

C=6.06607E−8, D=1.04825E−10 variable amounts:

| f | 36.051 | 49.471 | 67.881 |
|---|---|---|---|
| $d_9$ | 7.947 | 4.333 | 1.700 | values of parameters in conditional formulas:

$f_I/f_W$=0.628, $f_{II}/f_T$=−0.936, $EP/f_W$=0.241, $AP_W/f_T$=−0.133, $f_4/f_I$= 0.828, $d_{11}/f_W$=0.120

Figure 5:
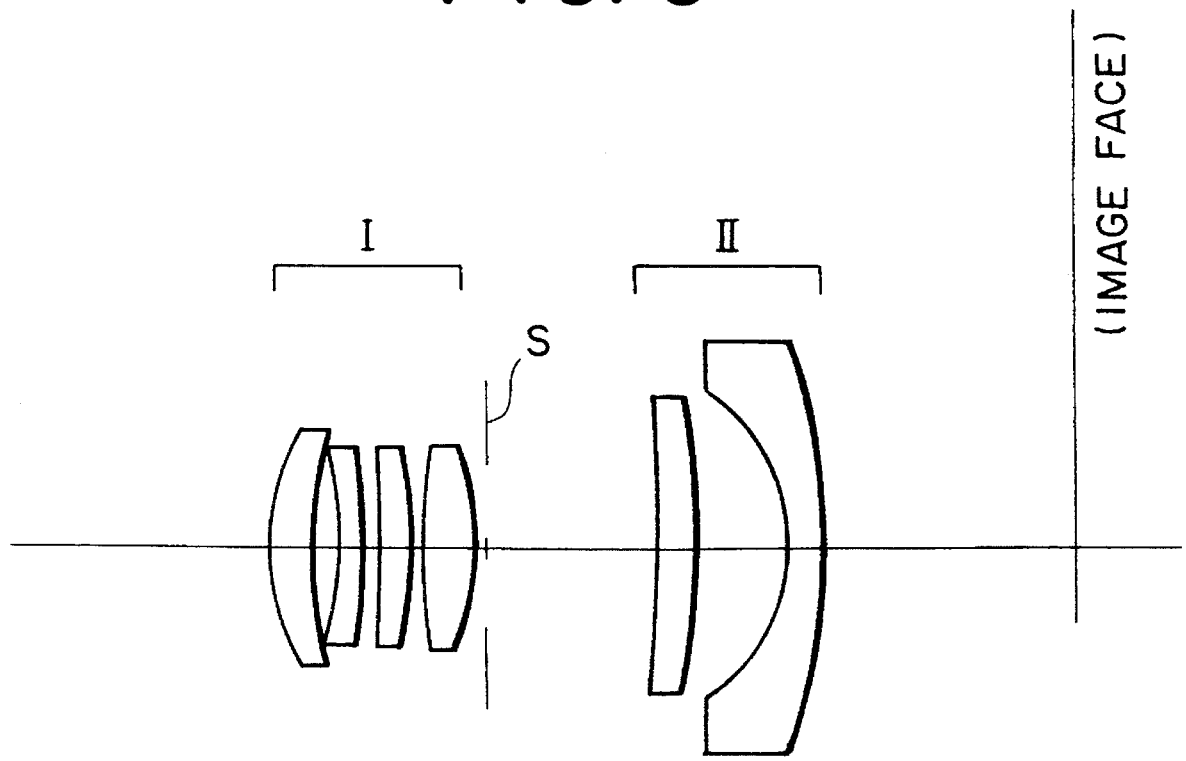
FIG. 5 is a view showing the construction of a zoom lens in accordance with an embodiment 5 of the present invention.

FIG. 5 shows the construction of a zoom lens in accordance with the embodiment 5.

FIGS. 6 to 8 show aberrations with respect to the embodiment 1. FIGS. 6, 7 and 8 respectively relate to a short focal end, an intermediate focal length and a long focal end of the zoom lens.

FIGS. 9 to 11 show aberrations with respect to the embodiment 2. FIGS. 9, 10 and 11 respectively relate to a short focal end, an intermediate focal length and a long focal end of the zoom lens.

FIGS. 12 to 14 show aberrations with respect to the embodiment 3. FIGS. 12, 13 and 14 respectively relate to a short focal end, an intermediate focal length and a long focal end of the zoom lens.

FIGS. 15 to 17 show aberrations with respect to the embodiment 4. FIGS. 15, 16 and 17 respectively relate to a short focal end, an intermediate focal length and a long focal end of the zoom lens.

FIGS. 18 to 20 show aberrations with respect to the embodiment 5. FIGS. 18, 19 and 20 respectively relate to a short focal end, an intermediate focal length and a long focal end of the zoom lens.

In each of the diagrams of spherical aberration and astigmatism, reference numerals d and g respectively designate spherical aberration (a broken line shows a sine condition) and astigmatism on a d-line and a g-line. In each of the diagrams of astigmatism, a solid line shows a sagittal image surface and a broken line shows a meridional image surface.

In each of the embodiments, the aberrations are preferably corrected at each of the short focal end, the intermediate focal length and the long focal end so that optical performance of the zoom lens is preferable.

As mentioned above, the present invention can provide a novel zoom lens.

The zoom lens in the present invention is constructed as above. Accordingly, although the zoom lens is simply constructed by two lens groups composed of six lenses, the zoom lens includes a wide half field angle equal to or greater than 30 degrees. The zoom lens has a practical zoom ratio close to two magnifications. An entire lens length at a long focal end is shorter than the focal length of an entire optical system at the long focal end. An entire lens group thickness (a distance from a lens front end at the long focal end to a lens rear end) is equal to or smaller than 0.95 times the height of a maximum image. Therefore, the zoom lens is extremely compact.

Accordingly, it is possible to realize a lens shutter camera having a zoom lens of two magnifications and a size approximately equal to that of a general lens shutter camera mounting a single focal lens thereon by using the compact zoom lens of the present invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A compact zoom lens in which a first lens group having a positive focal length is arranged on an object side and a second lens group having a negative focal length is arranged on an image side and a zooming operation is performed by changing a clearance between the first and second lens groups;

the first lens group comprising first, second, third and fourth lenses sequentially arranged from the object side such that the first lens is a positive meniscus lens having a convex face directed onto the object side;

the second lens is a negative meniscus lens having a convex face directed onto the image side;

the third lens is a positive meniscus lens having a convex face directed onto the image side; and the fourth lens is a positive lens having an image side face of large curvature compared to an object side surface of the fourth lens;

the second lens group comprising fifth and sixth lenses sequentially arranged from the object side such that the fifth lens is a positive meniscus lens having a convex face directed onto the image side; and the sixth lens is a negative meniscus lens having a convex face directed onto the image side;

the zoom lens having an aperture stop arranged just after the first lens group;

an object side face of the fourth lens and an object side face of the fifth lens having aspherical surfaces; and the following conditions $0.60 < f_I/f_W < 0.75$ $-1.10 < f_{II}/f_T < -0.90$ $EP/f_W < 0.25$ $AP_W/f_T > -0.16$ are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

2. A compact zoom lens as claimed in claim 1, wherein the following condition $X_7(H) < c_7 H^2 / \{1 + \sqrt{(1 - c_7^2 H^2)}\}$ is satisfied when H is a distance from an optical axis of the fourth lens to the object side face thereof;

$X_7(H)$ is a distance from a tangential plane on the optical axis in a position of H and is set such that a direction from the object side to the image side is positive; and $c_7$ is a paraxial curvature of the object side face of the fourth lens.

3. A compact zoom lens as claimed in claim 1 or 2, wherein the following condition $$X_{10}(H) > c_{10}H^2 / \left\{ 1 + \sqrt{(1 - c_{10}^2 H^2)} \right\}$$

is satisfied when H is a distance from an optical axis of the fifth lens to the object side face thereof;

$X_{10}(H)$ is a distance from a tangential plane on the optical axis in a position of H and is set such that a direction from the object side to the image side is positive; and $c_{10}$ is a paraxial curvature of the object side face of the fifth lens.

4. A compact zoom lens in which a first lens group having a positive focal length is arranged on an object side and a second lens group having a negative focal length is arranged on an image side and a zooming operation is performed by changing a clearance between the first and second lens groups;

the first lens group comprising first, second, third and fourth lenses sequentially arranged from the object side such that the first lens is a positive meniscus lens having a convex face directed onto the object side;

the second lens is a negative meniscus lens having a convex face directed onto the image side;

the third lens is a positive meniscus lens having a convex face directed onto the image side; and the fourth lens is a positive lens having an image side face of large curvature compared to an object side face of the fourth lens;

the second lens group comprising fifth and sixth lenses sequentially arranged from the object side such that the fifth lens is a positive meniscus lens having a convex face directed onto the image side; and the sixth lens is a negative meniscus lens having a convex face directed onto the image side;

the zoom lens having an aperture stop arranged just after the first lens group;

an object side face of the fourth lens and an image side face of the fifth lens having aspherical surfaces; and the following conditions $0.60 < f_I/f_W < 0.75$ $-1.10 < f_{II}/f_I < -0.90$ $EP/f_W < 0.25$ $AP_W/f_T > -0.16$ are satisfied when $f_W$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

5. A compact zoom lens as claimed in claim 4, wherein the following condition $$X_7(H) < c_7 H^2 / \left\{ 1 + \sqrt{(1 - c_7^2 H^2)} \right\}$$

is satisfied when H is a distance from an optical axis of the fourth lens to the object side face thereof;

$X_7(H)$ is a distance from a tangential plane on the optical axis in a position of H and is set such that a direction from the object side to the image side is positive; and $c_7$ is a paraxial curvature of the object side face of the fourth lens.

6. A compact zoom lens as claimed in claim 4 or 5, wherein the following condition $$X_{11}(H) < c_{11}H^2 / \left\{ 1 + \sqrt{(1 - c_{11}^2 H^2)} \right\}$$

is satisfied when H is a distance from an optical axis of the fifth lens to the image side face thereof;

$X_{11}(H)$ is a distance from a tangential plane on the optical axis in a position of H and is set such that a direction from the object side to the image side is positive; and $c_{11}$ is a paraxial curvature of the image side face of the fifth lens.

7. A compact zoom lens in which a first lens group having a positive focal length is arranged on an object side and a second lens group having a negative focal length is arranged on an image side and a zooming operation is performed by changing a clearance between the first and second lens groups;

the first lens group comprising first, second, third and fourth lenses sequentially arranged from the object side such that the first lens is a positive meniscus lens having a convex face directed onto the object side;

the second lens is a negative meniscus lens having a convex face directed onto the image side;

the third lens is a positive meniscus lens having a convex face directed onto the image side; and the fourth lens is a positive lens having an image side face of large curvature compared to an object side face of the fourth lens;

the second lens group comprising fifth and sixth lenses sequentially arranged from the object side such that the fifth lens is a positive meniscus lens having a convex face directed onto the image side; and the sixth lens is a negative meniscus lens having a convex face directed onto the image side;

the zoom lens having an aperture stop arranged just after the first lens group;

an object side face of the fourth lens and an object side face and an image side face of the fifth lens having aspherical surfaces; and the following conditions $0.60 < f_I/f_W < 0.75$ $-1.10 < f_{II}/f_I < -0.90$ $EP/f_W < 0.25$ $AP_W/f_T > -0.16$ are satisfied when $f_w$ is a focal length of an entire lens system at a short focal end;

$f_T$ is a focal length of the entire lens system at a long focal end;

$f_I$ is a focal length of the first lens group;

$f_{II}$ is a focal length of the second lens group;

EP is a distance from a lens front end to an entrance pupil; and $AP_W$ is a distance from a lens rear end at the short focal end to an exit pupil.

8. A compact zoom lens as claimed in claim 7, wherein the following condition $$X_7(H) < c_7H^2/\{1 + \sqrt{(1-c_7^2H^2)}\}$$

is satisfied when H is a distance from an optical axis of the fourth lens to the object side face thereof:

$X_7(H)$ is a distance from a tangential plane on the optical axis in a position of H and is set such that a direction from the object side to the image side is positive: and $c_7$ is a paraxial curvature of the object side face of the fourth lens.

9. A compact zoom lens as claimed in claim 7 or 8, wherein the following condition $$X_{11}(H) - X_{10}(H) < \left[c_{11}H^2/\left\{1 + \sqrt{(1-c_{11}^2H^2)}\right\}\right] - \left[c_{10}H^2/\left\{1 + \sqrt{(1-c_{10}^2H^2)}\right\}\right]$$

is satisfied when H is a distance from an optical axis of the fifth lens to the object side face thereof;

$X_{10}(H)$ is a distance from a tangential plane on the optical axis in a position of H and is set such that a direction from the object side to the image side is positive; and $c_{10}$ is a paraxial curvature of the object side face of the fifth lens; and H is a distance from an optical axis of the fifth lens to the image side face thereof;

$X_{11}(H)$ is a distance from a tangential plane on the optical axis in a position of H and is set such that a direction from the object side to the image side is positive; and $c_{11}$ is a paraxial curvature of the image side face of the fifth lens.

10. A compact zoom lens as claimed in claim 7 or 8, wherein the following conditions $$0.75 < f_4/f_I < 0.95$$

$$0.08 < d_{11}/f_W < 0.14$$

are satisfied when $f_4$ is a focal length of the fourth lens; and $d_{11}$ is a face distance on the optical axis between the image side face of the fifth lens and an object side face of the sixth lens.

11. A compact zoom lens as claimed in claim 7 or 8, wherein the following conditions $$n_2 > 1.75$$

$$n_6 > 1.70$$

$$\nu_6 > 40.0$$

are satisfied when $n_2$ is a refractive index of a material of the second lens;

$n_6$ is a refractive index of a material of the sixth lens; and $\nu_6$ is an Abbe's number of the sixth lens.

* * * * *